(12) United States Patent
Roy Choudhury

(10) Patent No.: US 11,496,865 B2
(45) Date of Patent: Nov. 8, 2022

(54) PRIVACY-PRESERVING LOCATION BASED SERVICES

(71) Applicant: PCMS Holdings, Inc., Wilmington, DE (US)

(72) Inventor: Romit Roy Choudhury, Champaign, IL (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/609,428

(22) PCT Filed: Apr. 27, 2018

(86) PCT No.: PCT/US2018/029986
§ 371 (c)(1),
(2) Date: Oct. 29, 2019

(87) PCT Pub. No.: WO2018/204200
PCT Pub. Date: Nov. 8, 2018

(65) Prior Publication Data
US 2020/0145787 A1    May 7, 2020

Related U.S. Application Data

(60) Provisional application No. 62/502,262, filed on May 5, 2017.

(51) Int. Cl.
*H04W 4/029* (2018.01)
*H04W 4/23* (2018.01)
(Continued)

(52) U.S. Cl.
CPC ............. *H04W 4/029* (2018.02); *H04W 4/06* (2013.01); *H04W 4/12* (2013.01); *H04W 4/23* (2018.02); *H04W 4/33* (2018.02); *H04W 64/003* (2013.01)

(58) Field of Classification Search
CPC ....... H04W 4/80; H04W 4/021; H04W 4/029; H04W 4/46; H04W 4/02; H04W 4/14;
(Continued)

(56) References Cited

U.S. PATENT DOCUMENTS 7,769,633 B2   8/2010  Jokinen
9,208,518 B2   12/2015 Sushil et al.
(Continued)

FOREIGN PATENT DOCUMENTS

CN   101854653 A   10/2010
CN   101946267 A   1/2011
(Continued)

OTHER PUBLICATIONS

Azizyan et al., SurroundSense: Mobile Phone Localization via Ambience Fingerprinting, National Lab For Information Science and Technology MOBICOM'09, ACM, Beijing, China, Sep. 20, 2009, pp. 261-272, XP058288613 (Year: 2009).*
(Continued)

*Primary Examiner* — Nizar N Sivji
*Assistant Examiner* — Jing Gao
(74) *Attorney, Agent, or Firm* — Invention Mine LLC

(57) ABSTRACT

An exemplary method includes receiving, at a mobile device, a wireless message. The method includes determining, at the mobile device at a first location, first ambient signal data. The wireless message includes (i) message content and (ii) second ambient signal data for a second location, wherein the message content corresponds to the second location. The method includes comparing, at the mobile device, the first ambient signal data and the second ambient signal data. The method also includes determining, at the mobile device, whether to present a message indicative of the message content at a user interface of the mobile
(Continued)

device based at least in part on the comparison of the first ambient signal data and the second ambient signal data.

16 Claims, 15 Drawing Sheets

(51) Int. Cl.
    *H04W 4/33*  (2018.01)
    *H04W 4/06*  (2009.01)
    *H04W 4/12*  (2009.01)
    *H04W 64/00* (2009.01)

(58) Field of Classification Search
    CPC ........... H04W 4/33; H04W 4/38; H04W 4/70;
        H04W 4/90; H04W 4/023; H04W 4/027;
        H04W 4/06; H04W 4/12; H04W 4/44;
        H04W 4/48; H04W 64/003; H04W 84/18;
        H04W 12/002; H04W 12/00504; H04W
        12/02; H04W 16/28; H04W 24/10; H04W
        48/20; H04W 4/23; H04W 4/35; H04W
        72/042; H04W 76/19; H04W 84/005;
        H04W 84/12; H04W 36/24
    See application file for complete search history.

(56) References Cited

U.S. PATENT DOCUMENTS

| | | | |
|---|---|---|---|
| 9,424,598 B1 | 8/2016 | Kraft | |
| 2004/0093620 A1* | 5/2004 | Iino | H04H 20/28 725/32 |
| 2008/0003987 A1 | 1/2008 | Mechaley | |
| 2009/0309711 A1 | 12/2009 | Adappa | |
| 2012/0270503 A1 | 10/2012 | Park | |
| 2013/0260795 A1* | 10/2013 | Papakipos | H04W 52/0254 455/456.3 |
| 2014/0106710 A1* | 4/2014 | Rodriguez | H04W 4/80 455/411 |
| 2014/0324627 A1 | 10/2014 | Haver | |
| 2014/0365333 A1 | 12/2014 | Hurewitz | |
| 2015/0057035 A1* | 2/2015 | Somekh | H04L 51/14 455/466 |
| 2015/0088641 A1 | 3/2015 | Aoki | |
| 2015/0105111 A1 | 4/2015 | Rodriguez | |
| 2015/0142552 A1 | 5/2015 | Schmehl | |
| 2015/0269624 A1* | 9/2015 | Cheng | G06Q 30/0267 705/14.58 |
| 2015/0363837 A1 | 12/2015 | Lewis | |
| 2016/0278153 A1 | 9/2016 | Kim | |
| 2016/0292711 A1 | 10/2016 | Cho | |
| 2017/0070857 A1 | 3/2017 | Papakipos | |
| 2018/0197196 A1 | 7/2018 | Cho | |

FOREIGN PATENT DOCUMENTS

| | | | |
|---|---|---|---|
| CN | 102067578 A | 5/2011 | |
| CN | 102395100 A | 3/2012 | |
| CN | 105682224 A | 6/2016 | |
| CN | 105992134 A | 10/2016 | |
| CN | 106462878 A | 2/2017 | |
| KR | 20160021019 A | 2/2016 | |
| WO | 2009081307 A1 | 7/2009 | |
| WO | 2014074837 A1 | 5/2014 | |
| WO | WO-2016160376 A1 * | 10/2016 | G01S 1/024 |
| WO | 2017043746 A1 | 3/2017 | |
| WO | 2017102178 | 6/2017 | |
| WO | 2017155740 | 9/2017 | |

OTHER PUBLICATIONS

Nambiar, Varun, et. al., "SDR Based Indoor Localization Using Ambient WiFi and GSM Signals". International Conference on Computing, Networking and Communications (ICNC), (2017), pp. 952-957.

Leu, Jenq-Shiou, et. al., "Improving Indoor Positioning Precision by Using Received Signal Strength Fingerprint and Footprint Based on Weighted Ambient Wi-Fi Signals". Elsevier, Computer Networks, vol. 91, Nov. 14, 2015, pp. 329-340.

Wu, Chien Hsing, et. al., "Location-Aware Service Applied to Mobile Short Message Advertising: Design, Development, and Evaluation". Elsevier, Information Processing & Management, vol. 51, No. 5, Sep. 2015, pp. 325-642.

Wang, He, et. al., "Visually Fingerprinting Humans Without Face Recognition". Proceedings of the 13th Annual International Conference on Mobile Systems, Applications, and Services, ACM, May 18-22, 201, 14 pages.

International Search Report and Written Opinion of the International Searching Authority for PCT/US2018/029986 dated Jul. 17, 2018.

Machado, Carlos. "Ambient Signals + Video Images = Higher Location Accuracy Yeah!". Retrieved on Apr. 7, 2017 from: https://www.accuware.com/blog/ambientsignalsplusvideoimages/, posted on May 20, 2016, 3 pages.

International Preliminary Report on Patentability for PCT/US2018/029986 dated Nov. 5, 2019, 9 pages.

* cited by examiner

PRIVACY-PRESERVING LOCATION BASED SERVICES

CROSS-REFERENCE TO RELATED APPLICATIONS

The present application is a national stage application under 35 U.S.C. § 371 of International Application No. PCT/US2018/029986, entitled "PRIVACY-PRESERVING LOCATION BASED SERVICES," filed on Apr. 27, 2018, which claims benefit under 35 U.S.C. § 119(e) from U.S. Provisional Patent Application Ser. No. 62/502,262, filed May 5, 2017, entitled "Systems and Methods for Providing Privacy-Preserving Location Based Services," which is incorporated herein by reference in its entirety.

BACKGROUND

Many of today's localization solutions have tradeoffs between accuracy and infrastructure cost. This may be especially true for indoor localization, which may be, for example, very challenging absent heavy investments in infrastructure. Moreover, localization of a user in an indoor space may compromise privacy of the user and/or others.

SUMMARY

For some embodiments, a method may include: receiving, at a mobile device, a wireless message; determining, at the mobile device at a first location, first ambient signal data, wherein the wireless message includes (i) message content and (ii) second ambient signal data for a second location, wherein the message content corresponds to the second location; comparing, at the mobile device, the first ambient signal data and the second ambient signal data; and determining, at the mobile device, whether to present a message indicative of the message content at a user interface of the mobile device based at least in part on the comparison of the first ambient signal data and the second ambient signal data.

For some embodiments, a mobile device may include: a user interface; a processor; and a non-transitory computer-readable medium storing instructions operative when executed on the processor to perform functions that may include: receiving a wireless message; measuring at a first location of the mobile device, a first ambient signal level; wherein the wireless message includes (i) message content and (ii) a second ambient signal level for a second location, wherein the message content corresponds to the second location; comparing the first ambient signal level and the second ambient signal level; and determining whether to present a message indicative of the message content at the user interface of the mobile device based at least in part on the comparison of the first ambient signal level and the second ambient signal level.

For some embodiments, a method may include: identifying a shape indicative of a user at a first location using video camera data; determining a first ambient signal level for the first location based at least in part on previously surveyed ambient signal data corresponding to the first location; and sending a wireless message to at least a mobile device in range of the first location, wherein the wireless message includes (i) message content and (ii) the first ambient signal level for the first location, wherein the message content corresponds to the first location and is intended to target the user at the first location, and wherein the wireless message does not include a network address for the mobile device in range of the first location.

For some embodiments, a system may include: a processor; and a non-transitory computer-readable medium storing instructions operative when executed on the processor to perform functions that may include: identifying a shape indicative of a user at a first location using video camera data; determining a first ambient signal level for the first location based at least in part on previously surveyed ambient signal data corresponding to the first location; and sending a wireless message to at least a mobile device in range of the first location, wherein the wireless message includes (i) message content and (ii) the first ambient signal level for the first location, wherein the message content corresponds to the first location and is intended to target the user at the first location, and wherein the wireless message does not include a network address for the mobile device in range of the first location.

Figure 9A:
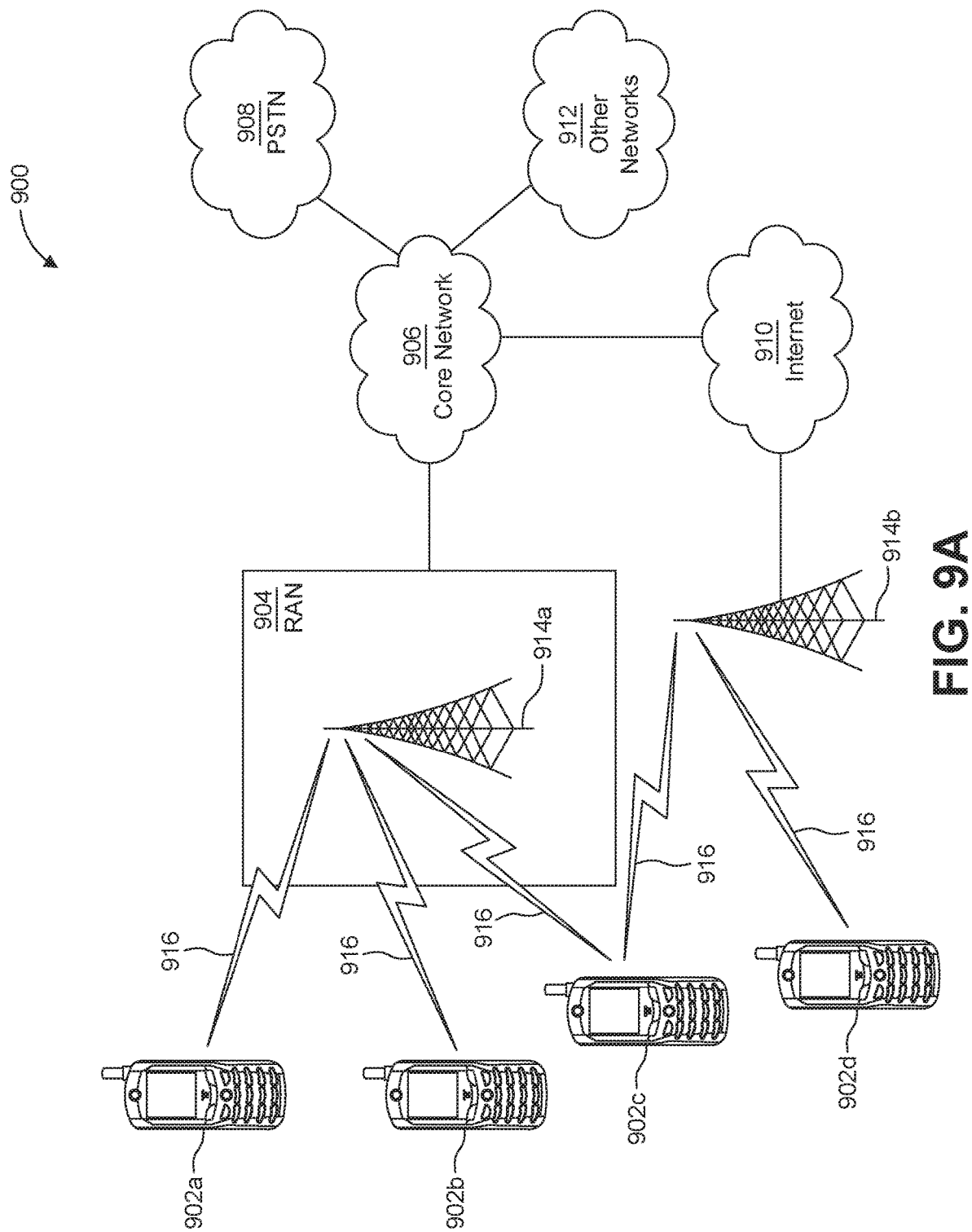
FIG. 9A is a system diagram illustrating an example communications system in which one or more disclosed embodiments may be implemented.

that may be used within the communications system illustrated in FIG. 9A according to an embodiment.

Figure 9B:
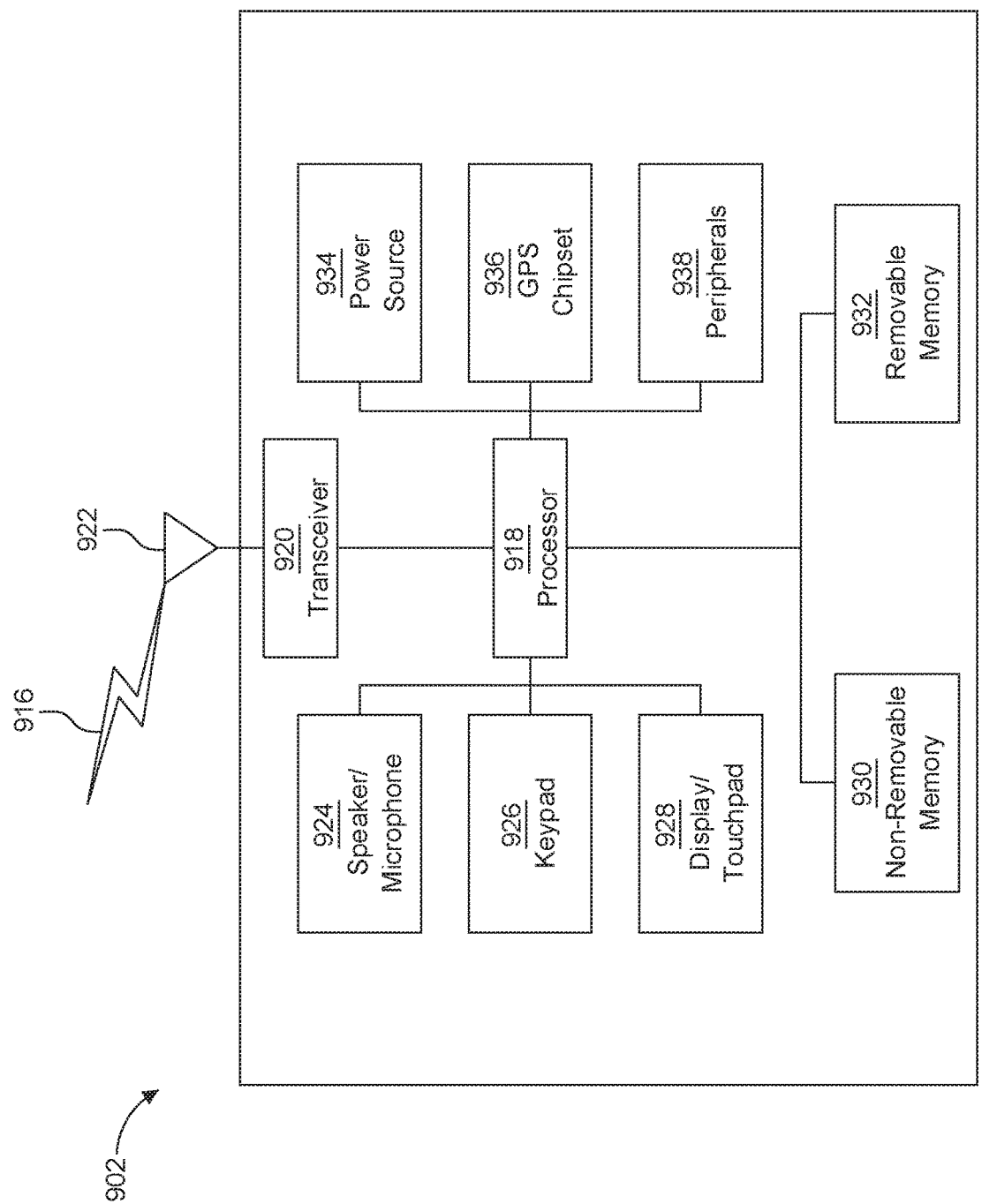
FIG. 9B is a system diagram illustrating an example wireless transmit/receive unit (WTRU) that may be used within the communications system illustrated in FIG. 9A according to an embodiment.
Figure 9C:
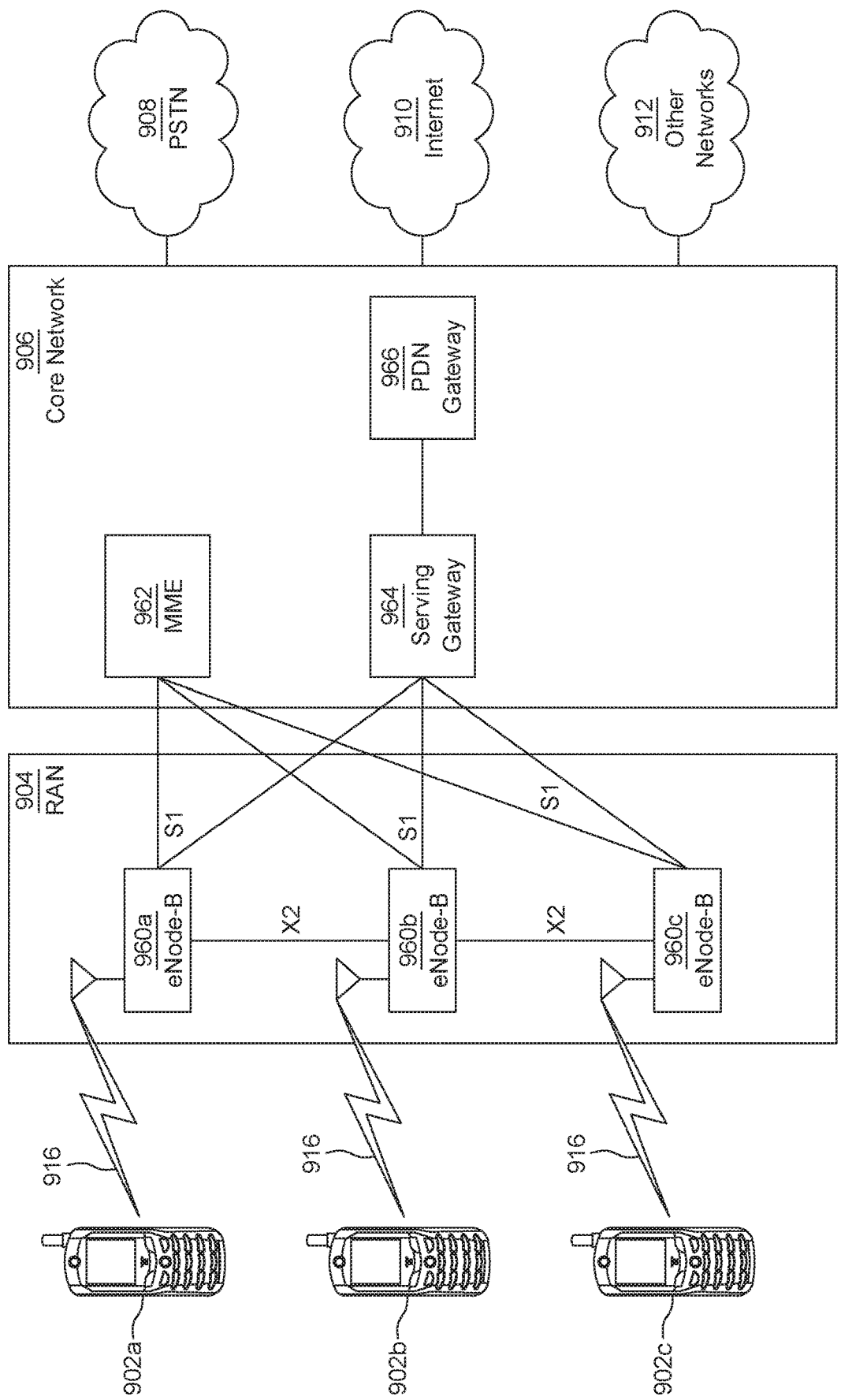
FIG. 9C is a system diagram illustrating an example radio access network (RAN) and an example core network (CN)
Figure 9D:
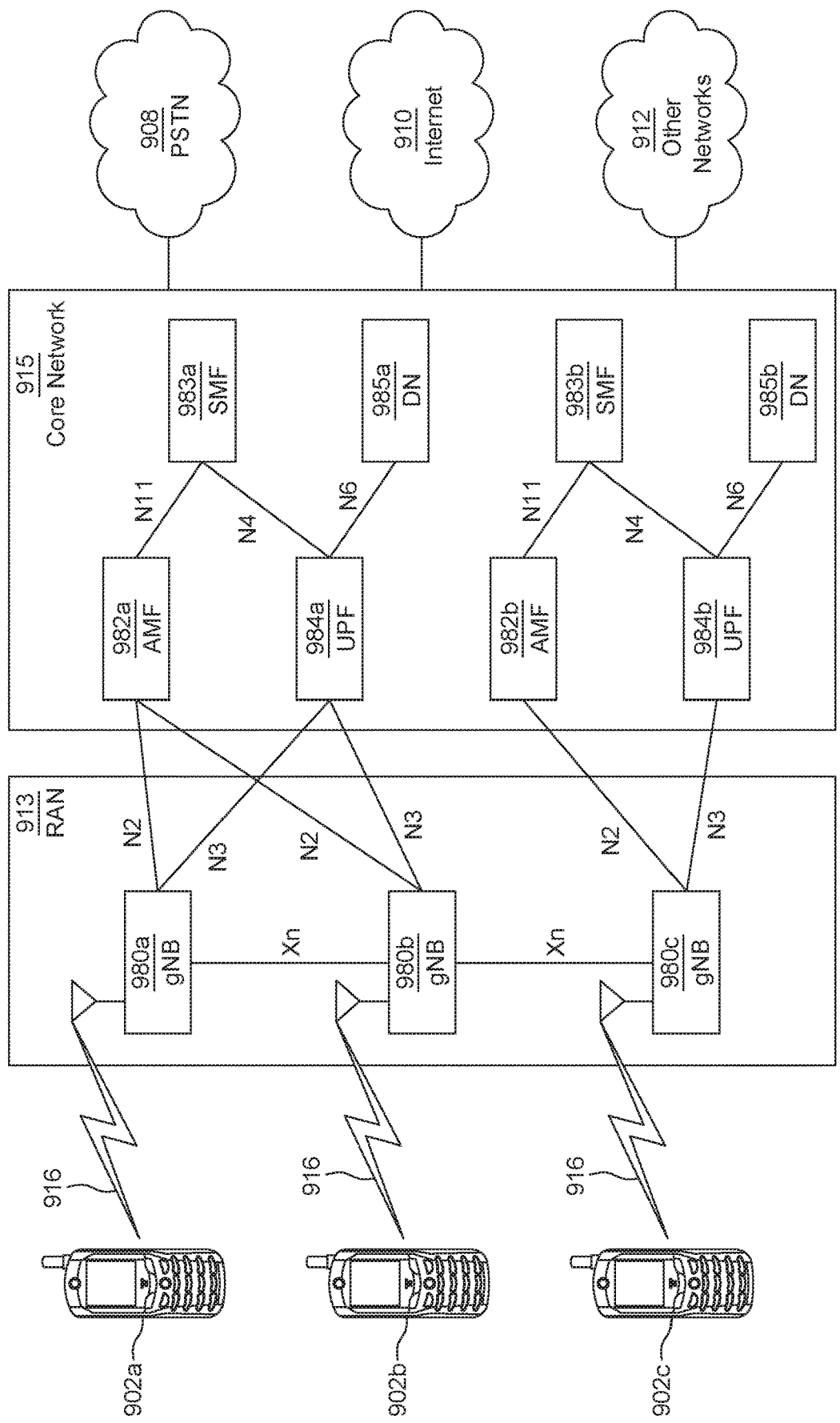

FIG. 9D is a system diagram illustrating a further example RAN and a further example CN that may be used within the communications system illustrated in FIG. 9A according to an embodiment.

Before proceeding with this disclosure, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . " And it is for reasons akin to brevity and clarity of presentation that this implied leading clause is not repeated ad nauseum in the below detailed description.

DETAILED DESCRIPTION

Many of today's localization solutions have tradeoffs between accuracy and infrastructure cost. This may be especially true for indoor localization, which may be, for example, very challenging absent heavy investments in infrastructure. Moreover, localization of a user in an indoor space may compromise privacy of the user and/or others.

Some outdoor localization solutions, such as GPS technologies and the like, may be very energy hungry and therefore may have difficulty continuously running on some devices. However, to proactively pop up location-based alerts and/or services, continuous localization may be needed.

Without even considering problems associated with continuous localization with current localization technology, for a location-based service (LBS) to communicate to a client's device (e.g., smartphone), the LBS may be required to have some form of "address", like a MAC/IP address, from the client. This is a growing privacy concern.

Today's outdoor LBS solutions may be categorized, for example, as "precise and reactive" or "coarse-grained and proactive." "Precise and reactive" solutions may describe LBS solutions in which a smartphone computes a user's GPS location when the user requests a service, and the response to the request may then refined based on the user's precise GPS location.

"Proactive and coarse-grained" solutions may describe LBS solutions in which some services use energy-efficient techniques, like geo-fencing, to continuously track a user's coarse location, and responds when this coarse location meets some criteria. For example, Google NOW may detect that a user is near the user's office parking lot at 6 pm and shows traffic conditions for the user's route back home.

There are many startups and research projects in universities attempting to address indoor localization, but they may be associated to a "cost", such as new WiFi hardware, placing beacons in the environment, periodic calibration and maintenance, or hardware upgrades to phones, among others.

Google NOW is a proactive LBS for outdoor environments. For indoors, Google is offering some WiFi-based localization services, for example, in airports, but the accuracy of such services may be unstable.

Pokemon Go is another LBS, but may operate with very coarse-grained location accuracy for short durations of time. Moreover, in these cases, Google and Pokemon Go may have substantial information regarding the user's moving patterns, which may create privacy concerns for a user.

Beacons: Apple is pushing for beacon placements in shopping malls. The idea is that phones may come in proximity to Bluetooth (BLE) beacons and thereby infer their own locations (since the beacon can continuously transmit its own location along with coupons and promotions). This may be a reliable solution that may work in various environments (unlike several other localization technologies).

Some beacon deployments may have disadvantages to be overcome and some may be described as follows. The beacons need to be placed manually, or by a robot, and batteries changed periodically. The beacons are statically programmed. For example, if the beacon is configured to send toothpaste promotion coupons, the beacon cannot generally be reprogrammed remotely to modify the promotion; rather, someone has to walk up to the beacon and use BLE to reprogram the beacon. Beacons generally do not offer blanket localization across an entire shopping floor; hence, the service that can be offered through this platform is "pre-defined" and "localized." Unless all beacons speak the same protocol standard, the users may need to have a different application for different kinds of beacons. For example, if WalMart has Apple beacons and Target has a Facebook beacon, the same application on the user's phone may not be able to interact with both beacons. Adjusting the transmit power of a beacon may be tricky. With low transmit powers, several customers may miss the beacon, while with high transmit powers, the toothpaste beacon may become audible at the next cereal aisle.

There are techniques for wireless fingerprinting and mapping, where the idea is to survey the wireless signals at each location and utilize these signals as a fingerprint for device localization. These fingerprints may not be unique, and they may be at coarse-grained spatial resolution. Thus, WiFi-based localization techniques may be unreliable and not robust, and localization errors may exceed 3-4 m.

Systems and methods presented herein in accordance with some embodiments may allow for one device to communicate with another device by using known attribute information of a location and observed location information to address the other device. The transmitting device may communicate with the receiving device without the transmitting device being provided with an address (e.g., a network address) of the receiving device. Instead of being provided with an address of the receiving device, the transmitting device may determine a unique (e.g., temporarily unique) attribute of the receiving device (e.g., the receiving device's sensor data). The determined unique attribute may be broadcast with data intended for the receiving device to the receiving device and possibly other devices. The determined unique attribute may serve as a flag to the receiving device that the receiving device is an intended recipient device for that data. The receiving device may determine based at least in part on the determined unique attribute that the receiving device is an intended recipient device for the data transmitted by the transmitting device. Responsive to the determination, the recipient device may perform one or more functions based on the data, such as presenting the data to the receiving-device user. Other attributes may additionally or alternatively be determined, such as a heart rate of a user of the receiving device (which can, for example, be monitored from a camera facing the user's face).

Systems and methods presented herein in accordance with some embodiments may be employed (e.g., by an enterprise)

to offer location-based services to a user while simultaneously preserving the user's location privacy. An example method in accordance with some embodiments includes: performing a one-time measurement of ambient signals in an indoor environment (e.g., magnetic field direction, intensity, or relative change, light intensity, WiFi, 5G, etc.), using a camera to localize one or more users on the floor, and using the ambient signals as the "address" for data communication. In some embodiments, the user's device senses/measures at least one of the ambient attributes and is able to determine that a message is intended for the user (as opposed to other users) by matching the address included in the data sent by a device in communication with the camera against the device's own sensor data. As a result, the appropriate user's device may accept the data while other users' devices may determine that the data is not meant for them.

Systems and methods presented herein in accordance with some embodiments may employ multi-modal sensor data that make up a communication address and may do so without relying on estimating a user's motion patterns. Estimating a user's motion patterns may be challenging if the user's mobile-device location is not known (e.g., whether the user's phone in the user's pant pocket, jacket pocket, backpack, etc.). Some exemplary embodiments utilize ambient signals recorded by the user's phone as a function of its location.

Systems and methods provided herein in accordance with some embodiments may be for wirelessly transmitting information to an unknown recipient in a known location. In a configuration stage of an exemplary embodiment, signal levels (e.g. the strength of signals from various access points) may be measured at a plurality of locations and stored in a lookup table. To transmit a message to a user in a particular location, an exemplary system may, for example, look up the previously-measured signal levels at that location and broadcast a message that includes the signal level information as an ad hoc address. One or more mobile devices may receive the message, but the message may be disregarded unless the signal levels reported in the message are sufficiently close to signal levels currently measured at the mobile device. If the reported and measured signal levels are sufficiently close, the message may be provided to a user of the mobile device, for example, via a user interface of the mobile device.

In some embodiments, for example, by using a camera for localization, localization accuracy issues associated with some other localization techniques may be minimized or eliminated. Unlike with WiFi techniques, embodiments disclosed herein allow for localization to arbitrarily very high accuracy.

In at least some embodiments, the wireless (and other sensor) signals are not unique across locations but are unique for each location at which a user is located. In some scenarios, this may be a much weaker assumption and may be much more robust. In case two users are at two different locations with non-unique signals (e.g., which may be very unlikely given that, in some embodiments, signals are multi-modal), the system may wait until it is determined, for example, through the use of a camera that the users have moved to different unique locations.

In an exemplary system that uses one or more cameras to compute the location of the user, highly personalized and accurate location-based services may be transmitted to the user's device. The user's location privacy may be protected, for example, because transmitting data to the user's mobile device may not require knowledge of any ID for the user (such as, for example, an IP address or a MAC address). That is, in some embodiments, a system might be aware (e.g., from camera information) that there is a random unidentified user at a location to be targeted, but generally may not know (or need to now) any ID for the user that would or could identify the random unidentified user as a specific user and thus compromise the specific user's privacy.

At least some embodiments use cameras as infrastructure and may not employ a user's phone to perform any heavy computation. This may offer an advantage in accuracy of the user's location (since the system may pinpoint the location using one or more cameras), and the camera-based location may be more robust. Moreover, exemplary embodiments may preserve privacy and provide a flexible framework to update location-based information on the fly.

For simplicity, many examples discussed herein refer to and include users with mobile devices, e.g., at the same location, and, in places, "user(s)" and "device(s)" may be discussed interchangeably for ease of description. Nonetheless, it will be understood from context what is being referenced. For example, where a user is holding a or carrying a mobile device on their person, or the mobile is, e.g., transported by or located with the user, "transmitting information to a user" may be understood, e.g., from context to refer to, e.g., "transmitting information to a user (via the user's mobile device)" or, e.g., transmitting information to (the user's) mobile device."

Figure 1:
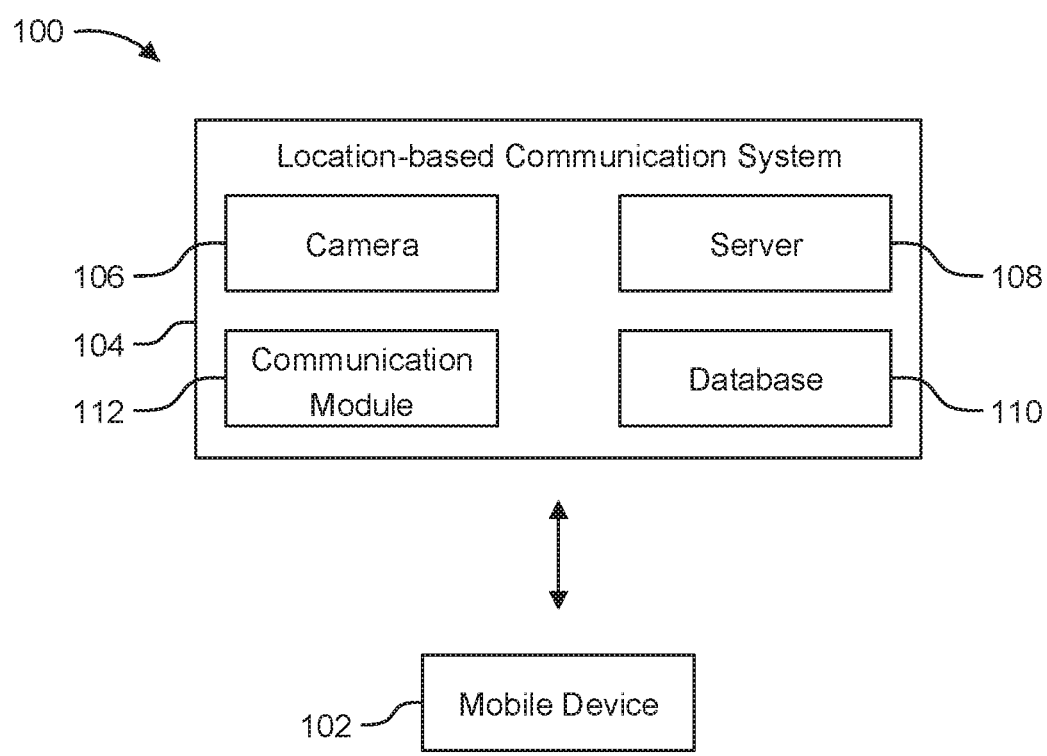
FIG. 1 is a block diagram illustrating an example system including an example location-based communication system and an example mobile device in accordance with some embodiments.

FIG. 1 is a block diagram illustrating an example system 100 including an example mobile device 102 and an example location-based communication system 104 in accordance with some embodiments. The location-based communication system 104 may be configured to observe one or more users in an environment (indoor, outdoor, or a combination of both) and/or may be configured to determine a user's location in the environment. The location-based communication system 104 may be configured to transmit a message to a user's mobile device, such as for example, the mobile device 102, in the environment based at least in part on the user's location in the environment and/or characteristics of the user's location. For example, the location-based communication system 104 may detect that a user is in a particular aisle or at a particular shelf in an environment, such as for example, a retail store, and may transmit offer information to the user's mobile device based on items for sale in the particular aisle or at the particular shelf.

The location-based communication system 104 may be configured to obtain ambient-signal data corresponding to one or more locations in the environment. The location-based communication system 104 may maintain respective ambient-signal data for various locations in the environment. The location-based communication system may generate and/or have access to a database (e.g., database 110) mapping at least some locations in the environment to the corresponding location's ambient-signal data. The ambient-signal data may include ambient-signal measurements taken at various locations in the environment. For example, ambient-signal measurements for a front entrance of a store may be mapped to a location on a floorplan of the store corresponding to the front entrance of the store.

The location-based communication system 104 may use a user's determined location to obtain ambient-signal data from the map for that determined location. For example, the location-based communication system 104 may determine that a user is at the front entrance of the store and may obtain the ambient-signal data that are mapped to the front entrance.

The location-based communication system 104 may communicate a message to a mobile device of a user in the environment by marking the message with a destination address based on ambient-signal data corresponding to the user's location. The location-based communication system 104 may transmit the message to a set of one or more devices, the set including the mobile device. For example, the location-based communication system may broadcast the message with the destination address (e.g., over WiFi).

The mobile device 102 may be configured to record data corresponding to one or more attributes at various locations in the environment. The mobile device 102 may include one or more sensors to sense one or more ambient signals. The mobile device 102 may be configured to sense ambient signals and maintain mobile-device-sensed ambient-signal data for the sensed ambient signals. The mobile-device-sensed ambient-signal data may be maintained for the same kind of ambient signals as at least some of the ambient signals for which the location-based-system ambient-signal data are maintained.

To sense the ambient signals, the mobile device 102 may include an e-magnetometer, a light sensor, an e-barometer, an e-compass, an antenna, a microphone, a humidity sensor, a chemical sensor, and/or any other suitable sensor(s). The mobile device 102 may include one or more additional or alternative components and an exemplary embodiment of a mobile device may be the WTRU 902 described in more detail below.

The mobile device 102 may be configured to receive the message with the destination address transmitted from the location-based communication system. The mobile device 102 may sense one or more ambient signals that may be used for determining that the mobile device 102 is or is not an intended recipient of the received message. The mobile device 102 may include a client application that filters out received messages having a destination address that do not match (e.g., within a threshold matching score) the mobile-device generated address.

As illustrated in FIG. 1, the example location-based communication system 104 in accordance with some embodiments includes, for example, a camera 106, a server 108, a database 110, and a communication module 112.

In at least one embodiment, the camera 106 is a video camera and provides data of its view of an environment and/or users within the environment to the server 108 for processing. The location-based communication system 104, for example, may be configured to compute, based on video camera data, a person's location, for example, with very high accuracy and reliability. The location-based communication system 104, for example, may be configured to compute a person's location using blurred, low-resolution images and may do so without recognizing the person as more than a blob distinct from a surrounding environment.

In some embodiments, the location-based communication system 104 may survey the area (e.g., a floor of a large retail store) and/or create a map of multi-modal ambient sensor signals measurable at different locations on this floor. For example, a store employee and/or a robot may use sensors to sense ambient signals at various locations in the environment and record the results. For example, at every location <X, Y> the map can contain the corresponding sensor signals such as <Magnetic Field, Light Intensity, WiFi signal strength, WiFi SSID, 4G signal strength, 5G signal strength, etc.>.

One or more of these ambient signals may be measured by the user's device (e.g., via sensors of the user's phone). The location-based communication system 104 may determine that the phone is measuring these signals since the camera may determine the user's exact location. In other words, if a particular location is associated with a particular set of ambient sensor signals measurable at that particular location, then since the camera 106 may determine that a user is at the user's particular location, the system would know that the user's device (e.g., phone) may be, or is, if so configured, measuring one or more ambient sensor signals at that particular location.

Thus, in some embodiments, the location-based communication system 104 may send location-based information to the phone by using the ambient signals as an ad hoc address. The phone may match the camera-sent ambient signals with its own sensor-estimated patterns. In some embodiments, the matching should be successful for only one user and fail for all others, thereby allowing for client-specific location-based data communication, without any privacy violation. Because the phone's IP/MAC address does not need to be known by the location-based communication system for the location-based communication system to communicate such location-based data, privacy intrusion may be minimized or eliminated.

If, for example, in some embodiments, the user does not want such location-based pop ups on the phone, the user can turn such a feature off. Of course, in some embodiments, such a feature might be provided on the phone as a standard feature, that is generally not capable of, or easily capable of, being turned off. In some embodiments, users may not need to download separate apps for each store—for example, just recording one's own sensor data is adequate.

Figure 2:
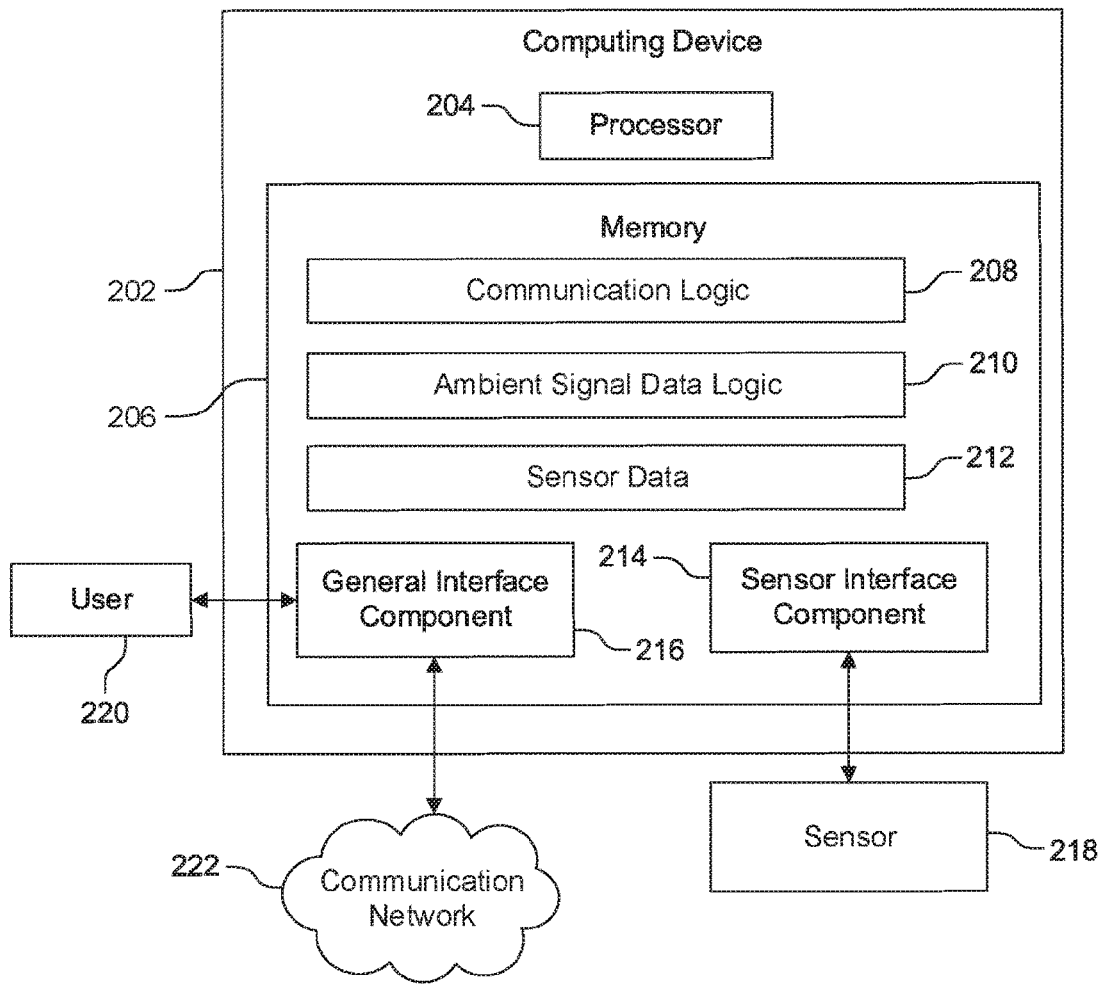
FIG. 2 illustrates an example computing device that may be employed as a mobile device in accordance with some embodiments.

FIG. 2 illustrates an example computing device 202 that may be employed as a mobile device, e.g., mobile device 102 of FIG. 1, in accordance with some embodiments. As illustrated, computing device 202 in accordance with some embodiments includes, for example, a processor 204 and a memory 206. Processor 204 is configured to execute instructions stored in memory 206. Memory 206 is a non-transitory computer-readable media that may hold logic and instructions that, when executed by processor 202 perform methods of various embodiments disclosed herein.

In some embodiments, memory 206 holds communication logic 208, ambient signal data logic 210, and sensor data 212. Sensor data may be stored in a database (DB). Memory 206 is shown as also including a general interface component 216 and a sensor interface component 214. General interface component 216 may, for example, enable a user 220 to see displays of data and software control options (such as perhaps a graphical user interface (GUI)) and input commands or control instructions computing device 202. General interface component 216 is also shown as connected to a communication network, 222 which may be any communication network described in FIGS. 9A-9D. Sensor interface component 214 is in communication with a sensor 218, which may collect data that is to be used for ambient signal data related tasks. It should be understood that FIG. 2 is a general illustration, and a particular embodiment of computing device 202 may not require all elements as shown, based on its particular function within a larger system environment.

Figure 3:
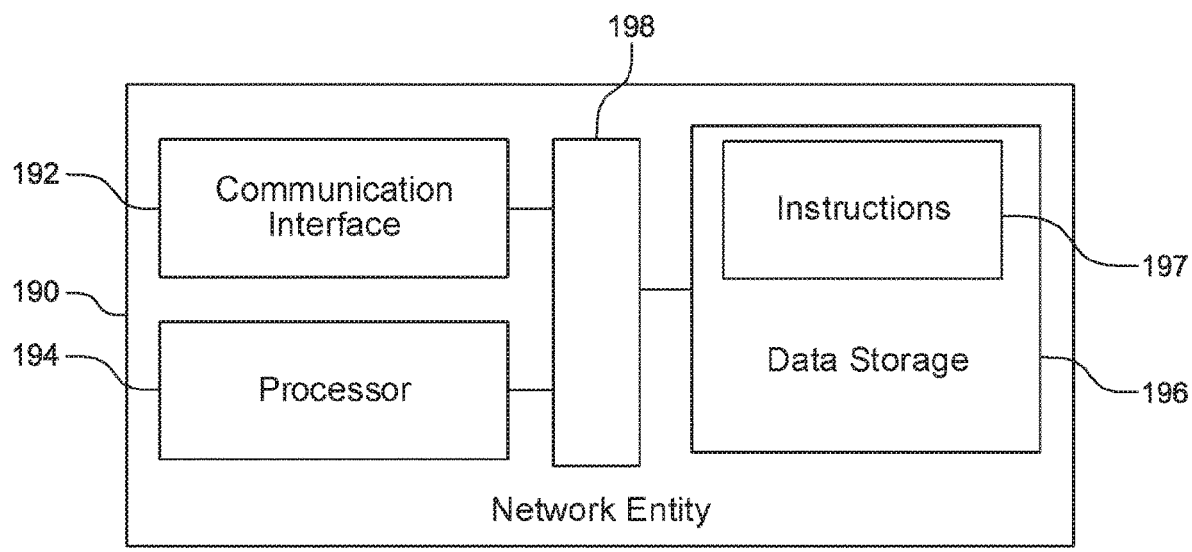
FIG. 3 illustrates an example network entity that may be employed as a location-based communication system and/or a server in accordance with some embodiments.

FIG. 3 depicts an example network entity 190 that may be used in embodiments of the present disclosure, for example as a location-based communication system and/or a server. As depicted in FIG. 3, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 3, data storage 196 contains program instructions 197 executable by processor 194 for carrying out various combinations of the various network-entity functions described herein.

Figure 4:
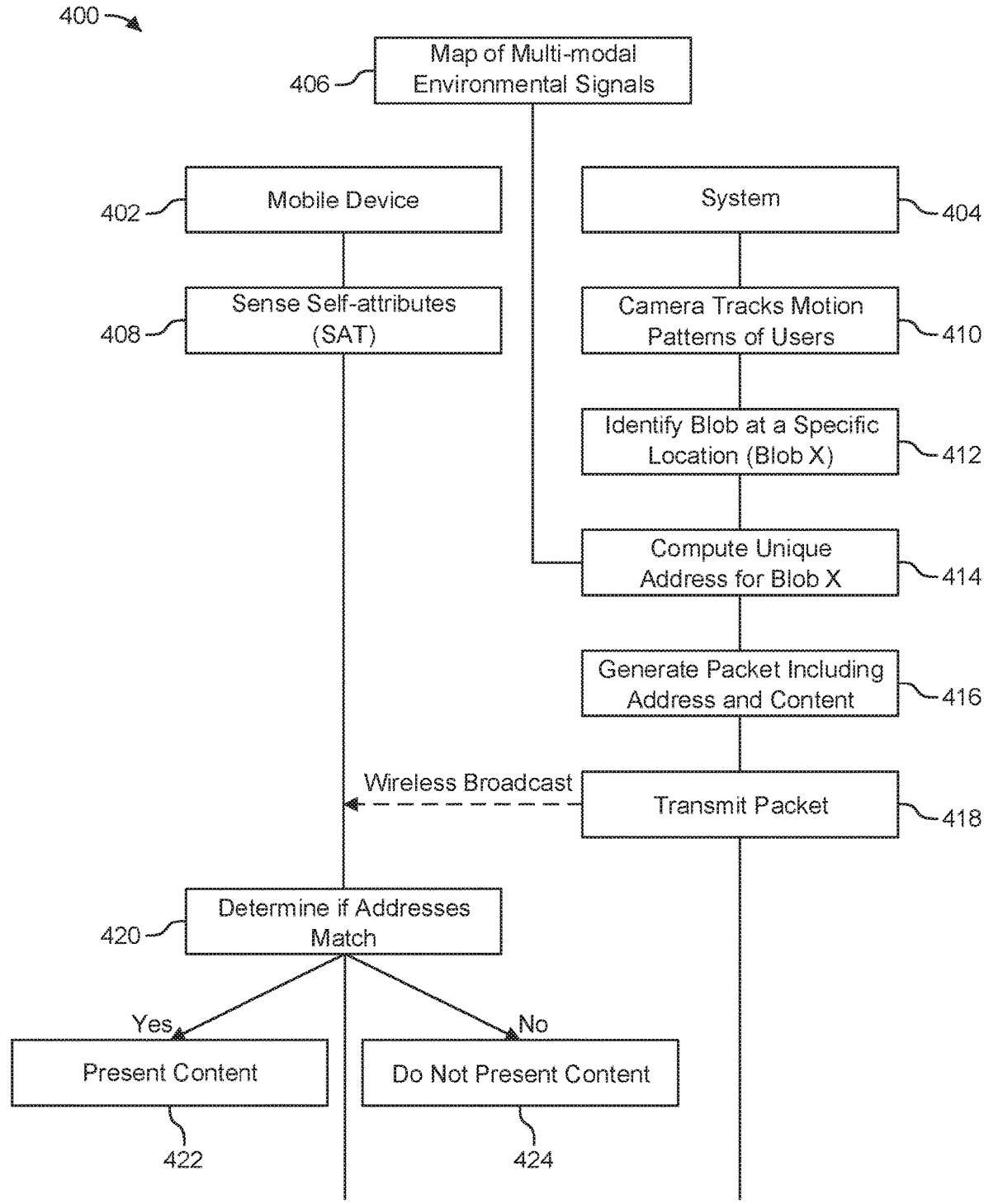
FIG. 4 is a flow diagram of an example process for communicating targeted information in accordance with some embodiments.

FIG. 4 is a flow diagram of an example process 400 for communicating targeted information in accordance with some embodiments. The targeted information may be transmitted from a remote device to a mobile device and/or may be presented on the mobile device. As depicted in FIG. 4, example data flow/data processing for one or more blocks of the example process 400 is carried out by and/or between a mobile device 402 of a user Alice who (in this example) is a shopper at a store and a location-based communication system 404 that (in this example) is installed (at least in part) in the store. In some embodiments, mobile device 402 may be, e.g., mobile device 102 of FIG. 1 and the location-based communication system 404 may be, e.g., the system 104 of FIG. 1. While the example of a user shopping in a store is used in FIG. 4, it will be understood that the example may be easily abstracted and applied to many types of device users in many types of environments.

A map of multi-modal environmental signals 406 may, for example, be created, accessed, and/or updated. For example, at deployment, the shopping floor may be surveyed and a map (or database) may be created of the form:

Location (X1, Y1): MagField (m1), LightIntensity(i1), WiFi_SSID(w11, w12, w13, . . . , w1n), WiFi_SS(s11, s12, s13, . . . , s1n), 5G_SS (g11, g12, . . . , g1n) . . .
Location (X2, Y2): MagField (m2), LightIntensity(i2), WiFi_SSID(w21, w22, w23, . . . , w2n), WiFi_SS(s21, s22, s23 . . . s2n), 5G_SS (g21, g22, . . . , g2n) . . .

The map 406 may include numerous locations and numerous environmental signal measurements. The map may include, e.g., some or all of the example environmental signal measurements and/or may include additional or alternative environmental signal measurements. In the example map: MagField(m1) and MagField(m2) correspond to a magnetic field signal sensed at their respective locations; LightIntensity(i1) and LightIntensity(i2) correspond to an intensity of a light signal sensed at their respective locations; WiFi_SSID(w11, w12, w13, . . . , w1n) and WiFi_SSID (w21, w22, w23, . . . , w2n) correspond to WiFi service set identifiers (SSIDs) of different WiFi access points (APs) sensed at their respective locations; WiFi_SS(s11, s12, s13, . . . , s1n) and WiFi_SS(s21, s22, s23 . . . s2n) correspond to WiFi signal strengths sensed at their respective locations; and 5G_SS (g11, g12, . . . , g1n) and 5G_SS (g21, g22, . . . , g2n) correspond to 5G signal strengths sensed at their respective locations.

In some embodiments, the mobile device 402 of the user Alice senses self-attributes (SAT) at 408. In this example, at various times, Alice may be standing or moving with the mobile device in the store. Alice, for example, may move with the mobile device to various locations in the store. At a given time, Alice may be at (or adjacent to) a location in the store that may be captured by a camera. At 410, a camera may track motion patterns of users. The camera may be a camera of the system 404 itself and/or may be a camera external to the system 404 that may be communicatively connected to the system 404. In some embodiments, as the mobile device 402 senses ambient environmental attributes via, e.g., one or more sensors of the mobile device 402, the mobile device 402, for example, may be in Alice's hand, in Alice's pocket, in Alice's bag, connected to or mounted on a body part of Alice (e.g., wrist, arm, head, etc.), in a shopping cart used by Alice, and/or may otherwise be transported by and/or located with Alice. The, e.g., one or more sensors that sense the ambient environmental attributes may be sensor(s) of the mobile device 402 itself and/or may be sensor(s) external to the mobile device 402 that may be communicatively connected to the mobile device 402.

In some embodiments, the location-based communication system 404 that may be installed in the store includes one or more cameras that may observe one or more users in the store. In this example, the location-based communication system 404 may include one or more cameras from the store's surveillance camera(s) (e.g., camera(s) that are already installed in the store) and/or may include one or more cameras separate from the store's installed camera(s). During operation, for example, the store's surveillance cameras may see users as blobs, standing or moving around in the store. The one or more cameras may observe users from a top-view. Any variety of human or object detection and/or tracking techniques may be used.

In some embodiments, the location-based communication system 404 computes the location of one or more users. For example, the location-based communication system 404 may determine the location of a user at a time t to be (X5, Y5) and may translate these coordinates into the user's corresponding location in the floorplan of the store (e.g., in front of the toothpaste shelf). The one or more cameras may detect a person (e.g., identify a human shape as an object or blob) at a specific location (e.g., a toothpaste aisle) 412 for which location-based content is to be delivered. This identified blob may be referred to as "blob X." In this example, Alice is blob X.

At 414, the system 404 may compute a unique address for blob X. For example, the system 404 may look up (e.g., query a database) ambient signal data corresponding to the location of blob X.

At 416, the system 404 may generate a packet including the address and content. For example, the system 404 may generate a data packet where the address for blob X serves as a destination address of the packet. The content may correspond to the location of blob X. For example, if a user stands at a toothpaste aisle, the location-based communication system 404 may accurately know this user's location, and the location-based communication system 404 may create, for example, a toothpaste coupon. For example, if the user is located in a predefined space of the store, such as a space in front of a toothpaste shelf, the location-based communication system 404 may generate a coupon and/or may transmit the coupon to the user based, at least in part, on the multi-modal environmental signals map 406. For example, the address of the coupon is the user's RF fingerprint.

In some embodiments, the location-based communication system 404 may not have any ID or name information of the users. The location-based communication system 404 may not even have information as to whether the user is equipped with a compatible mobile device. In response to a user being detected at a particular location, the system 404 may transmit a message using an ad hoc address corresponding to that location. The message may or may not be received by the user, depending on whether the user has a client device equipped to receive the message.

In some embodiments, the system 404 may transmit messages that include ad hoc addresses regardless of whether a user has been detected at a particular location. Such systems may be, for example, operative without the use of a camera or other user tracking system. In some embodiments, the system may transmit messages on a periodic basis (e.g., every 5 to 10 seconds). The message may be received, and the message body may be displayed to a user who happens to be at the corresponding location when the message is sent. If no user is at that location, the message may simply be disregarded. The system may send a plurality of messages that correspond to different locations on a continual basis. For example, a system may periodically transmit a toothpaste coupon with an ad hoc address corresponding to the oral care aisle and an orange juice coupon with an ad hoc address corresponding to the refrigerator aisle. Such messages may be received by all users within range, but the messages are displayed only to users in the oral care or refrigerator aisle, respectively.

In some embodiments, in the case of a customer being detected at, for example, location (X5, Y5), the location-based communication system 404 may look up the stored ambient environmental signals in the database for location (X5, Y5) and may obtain the various signals (RF fingerprint) corresponding to that location.

In some embodiments, because the location-based communication system 404 may determine the locations of other users in the store, the location-based communication system 404 may also obtain their respective signals from the database. In some embodiments, for example, for the user at location (X5, Y5), the location-based communication system 404 may identify parts of the signal that are unique, if any, against other users (e.g., some or all of other detected users) at the other locations. For example, let U(X5, Y5, t) denote the unique parts of the signals at location (X5, Y5) at the current time t. Note that at a later point in time, U(.) may be different, for example, because other users may be located at different locations. The location-based communication system 404 may then create a coupon, e.g., a toothpaste coupon. In this example, the address of the coupon is U(X5, Y5, t). As an example, U(X5, Y5, t) may be: m=3.4 micro-tesla, WiFi_SSID=grocery_guest. In some embodiments, this coupon may then be broadcast over WiFi or any other wireless medium.

At 418, the system 404 transmits the packet. For example, the system 404 may broadcast the packet.

In some embodiments, a user may install an application on the user's phone that records the user's phone's sensor data. Example technology that may be used for recording sensor data is currently available on many phones.

In some embodiments, the packet that is transmitted may be received by one or more mobile devices, for example, in range. For example, the mobile device 402 may be in range and may be configured to receive such a transmitted packet. At 420, the mobile device 402 may determine if the address included in the packet matches the address determined by the mobile device 402 (e.g., at 408). In some embodiments, upon receiving the coupon, a phone may compare its self-recorded sensor data against the U(X5, Y5, t) address of the coupon. For example, after receiving the coupon over WiFi, the phone may compare the phone's self-recorded sensor data with the broadcasted ad hoc address of the coupon.

At 422, if the mobile device 402 determines that the addresses match, the mobile device 402 may present the content included in the message. In some embodiments, the self-recorded sensor data of the intended recipient device is similar to the U(X5, Y5, t) address of the coupon. If the U(.) and the sensor data match, then the application may accept the coupon and may display, for example, the coupon to the user on a screen (e.g., of the mobile device). At 424, if the mobile device 402 determines the addresses do not match, the mobile device 402 may not present the content included in the message. For example, the coupon may be discarded (e.g., because it is not intended for the user's device and/or user).

One matching scheme that may be employed is using the edit distance or Hamming distance between some or all of each of the two data sets. For example, the location-based-system-obtained ambient-signal data may be a set of one or more data elements and the mobile-device-obtained ambient-signal data may be another set of one or more data elements, and these two data sets may be compared. For example, the edit distance and/or the Hamming distance between corresponding ambient-signal measurement types (e.g., SSIDs, RSSI values, magnetic field intensity, etc.) of the two data sets may be compared, and whether the comparison results in an edit distance and/or a Hamming distance for some or all of the compared ambient-signal measurement types being within a threshold value(s) may dictate if the two data sets are a match or are not a match. Additionally or alternatively, other techniques for matching or comparing may be used, such as, for example, dynamic time warping (DTW) or stochastic techniques.

In some embodiments, the matching may be performed based on a sum of squared differences (SSD) or sum of absolute differences (SAD) technique. For example, if the matching is performed based on a SAD technique, then absolute differences may be computed between each ambient-signal measurement of the location-based-system-obtained ambient-signal data and the corresponding ambient-signal measurement of the mobile-device-obtained ambient-signal data. The computed absolute differences may be summed to determine the SAD value. Then the SAD value may be compared to a threshold SAD value to determine whether the two sets of ambient-signal data are a close-enough match. If, for example, the match is performed based on a SSD technique, a similar process as just described for SAD may be performed, except instead of computing absolute differences, to compute the SSD value the differences are each squared and then the squared differences are summed. The SSD value may then be compared to a threshold SSD value to determine whether the two sets of ambient-signal data are a close-enough match.

In exemplary embodiments, no localization technology may be needed. In some embodiments, the system is not required to have any user's address since the user does not share any information about herself to the LBS, thus providing a privacy advantage.

In some embodiments, the location-based communication system may send the coupon with a broadcast MAC address, while the sensor-based address, which may be in a form such as U(X5, Y5, t) may be provided in the application layer. In some embodiments, a phone that receives the coupon may forward it to the application layer, which may then decide whether to accept or discard the packet.

In some embodiments, the phone may forward each incoming packet to the application layer. Additionally or alternatively, the phone may drop non-relevant packets at the MAC layer itself. In some embodiments, the location-based communication system may send a "HELLO" packet to one more phones once the camera has detected the respective phone's unique address. The phone may then configure the MAC layer to use this unique location information as its address, and the subsequent packets may be eliminated at the MAC layer itself (e.g., the MAC layer can perform the address comparison at Layer 2 itself).

For a variety of reasons, the computed addresses may not exactly match. For example, some phone sensors may not be accurate and/or cameras may get occluded, and as a result, the addresses used by the location-based communication system may not match the phone's self-recorded data exactly. In at least one embodiment, a matching algorithm, for example, used to compare the computed addresses accounts for at least some of the differences. One example approach is to accept a packet if the Hamming distance between the location-based-communication-system-determined address and the mobile-device-recorded address is less than some threshold. Although, for example, given other information about error(s) in the sensor(s), other algorithms may be employed. In some embodiments, for instance, signal correlation, dynamic time warping (DTW), Viterbi Decoding, etc. may be, for example, used to make the match more precise.

In some embodiments, the address may become more multi-dimensional as there are more users in the store. In other words, as more users are present, there are greater chances of the phones of two or more users being similar in any one dimension of addressing (e.g., both user's phones observing the same WiFi SSIDs). In some scenarios, it is extremely unlikely, however, that these phones of these two users will observe identical sensor data across all dimensions.

FIGS. 5A-5E illustrate an example use case in accordance with some embodiments. In the example use case, a retail store employs a location-based communication system. The example location-based communication system is configured to deliver targeted advertisements, offers, promotions, etc. to an individual (e.g., shopper) based on the individual's location in the store. While the example of a user shopping in a store is used in FIGS. 5A-5E and elsewhere, it will be understood that the examples may be easily abstracted and applied to many types of device users in many types of environments.

Various individuals may be in the store at various locations and at various times. At least some of the various individuals are observed by one or more cameras of the location-based communication system. At least some of these individuals have a mobile device that is configured to sense ambient signals.

Figure 5A:
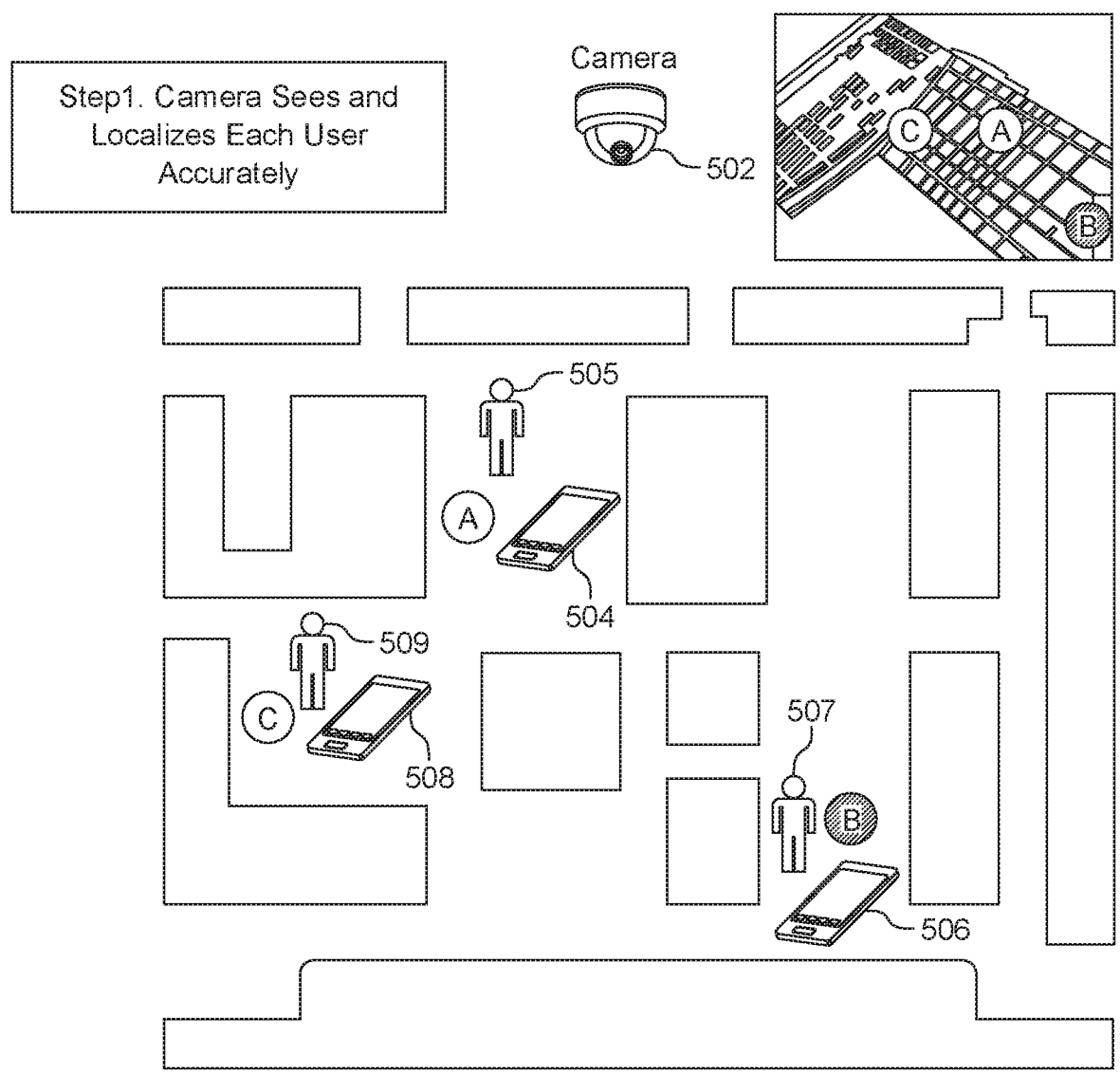
FIG. 5A illustrates an example layout of at least part of a retail store employing an example location-based communication system in accordance with some embodiments.

FIG. 5A illustrates an example layout of at least part of a retail store employing an example location-based communication system in accordance with some embodiments. A camera 502 of the location-based communication system observes three users (a first user 505, a second user 507, and a third user 509), which are located in FIGS. 5A-5E at pin A, pin B and pin C, respectively. As depicted in FIGS. 5A-5E, each user has a mobile device, respectively, mobile device 504, mobile device 506, and mobile device 508. The system may be configured to use one or more cameras to localize each user accurately. For example, assume that users 505, 507, 509 are located at locations on an example ambient-signal map <X3, Y6>, <X7, Y3>, and <X2, Y4>, respectively. For example, the system may determine that the first user 505 is located at location <X3, Y6>, the second user 507 is located at <X7, Y3>, and the third user 509 is located at <X2, Y4>. The example coordinates roughly correspond to how the users 505, 507, 509 are shown in FIGS. 5A-5E.

Figure 5B:
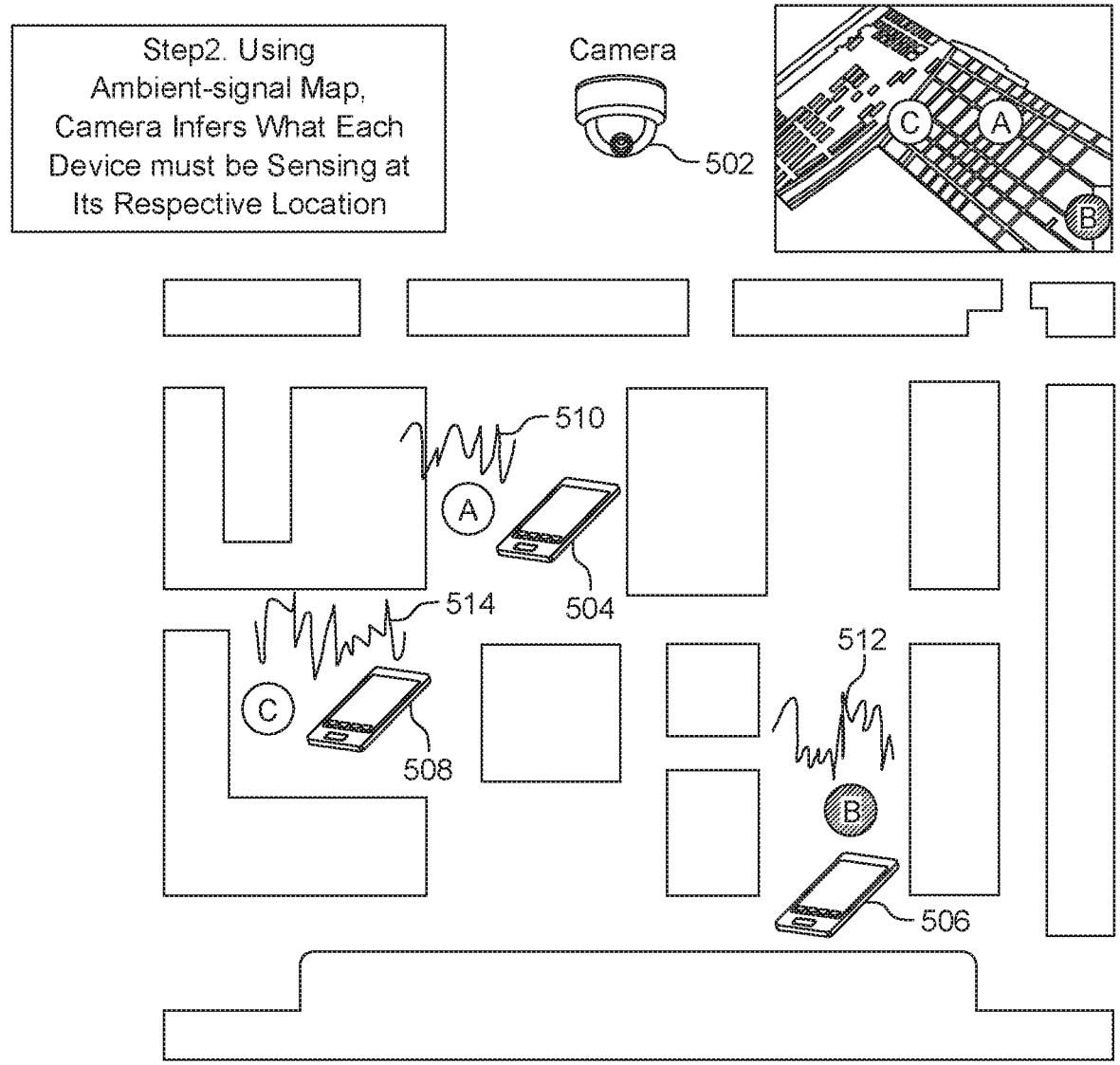
FIG. 5B illustrates the example layout of the retail store from FIG. 5A and additionally illustrates three example signals associated with the respective user locations in accordance with some embodiments.

FIG. 5B illustrates the example layout of the retail store from FIG. 5A and additionally illustrates three example signals associated with the respective user/mobile-device locations in accordance with some embodiments. In this example, each signal represents ambient-signal data for ambient signals measured at the corresponding location. For example, ambient signal 510 may be a representation of ambient signal data measured by the mobile device 504 of user 505. For example, ambient signal 512 may be a representation of ambient signal data measured by the mobile device 506 of user 507. For example, ambient signal 514 may be a representation of ambient signal data measured by the mobile device 508 of user 509. An example ambient-signal map (e.g., the map 406) may associate locations in the retail store to ambient-signal data for ambient signals measured at the corresponding location. Using the example ambient-signal map in accordance with some embodiments, measurements of ambient signals at a given location in the retail store may be determined. For example, at a time t the first user 505 is determined to be located at location <X3, Y6>. The ambient-signal map may include ambient-signal data for ambient signals measured prior to time t at location <X3, Y6>. The example ambient-signal map may be used to obtain this ambient-signal data for <X3, Y6>. Similarly, the example ambient-signal map may be used to obtain ambient-signal data for ambient signals measured at locations <X7, Y3> and <X2, Y4>, corresponding to example locations of the second user 507 and the third user 509.

Figure 5C:
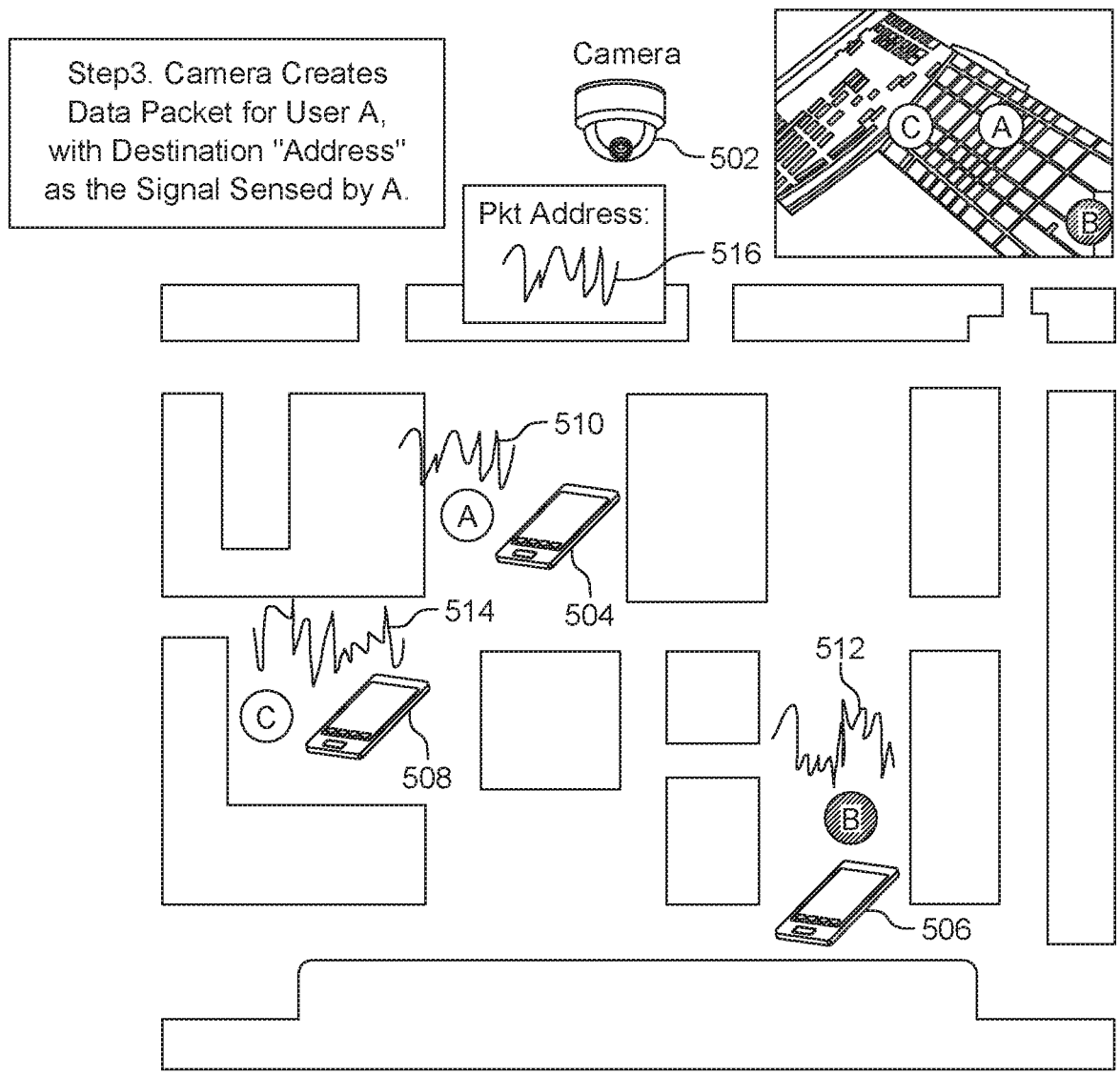
FIG. 5C illustrates the example layout of the retail store from FIG. 5A, the three example signals from FIG. 5B, and additionally illustrates an example data packet in accordance with some embodiments.

FIG. 5C illustrates the example layout of the retail store from FIG. 5A, the three example signals from FIG. 5B, and additionally illustrates an example data packet in accordance with some embodiments. In this example, the location-based communication system is configured to provide a data packet to respective mobile devices of one or more users detected at location <X3, Y6>. A data packet may be generated that has a destination address 516 that is the ambient-signal data for <X3, Y6> from the ambient-signal map.

Figure 5D:
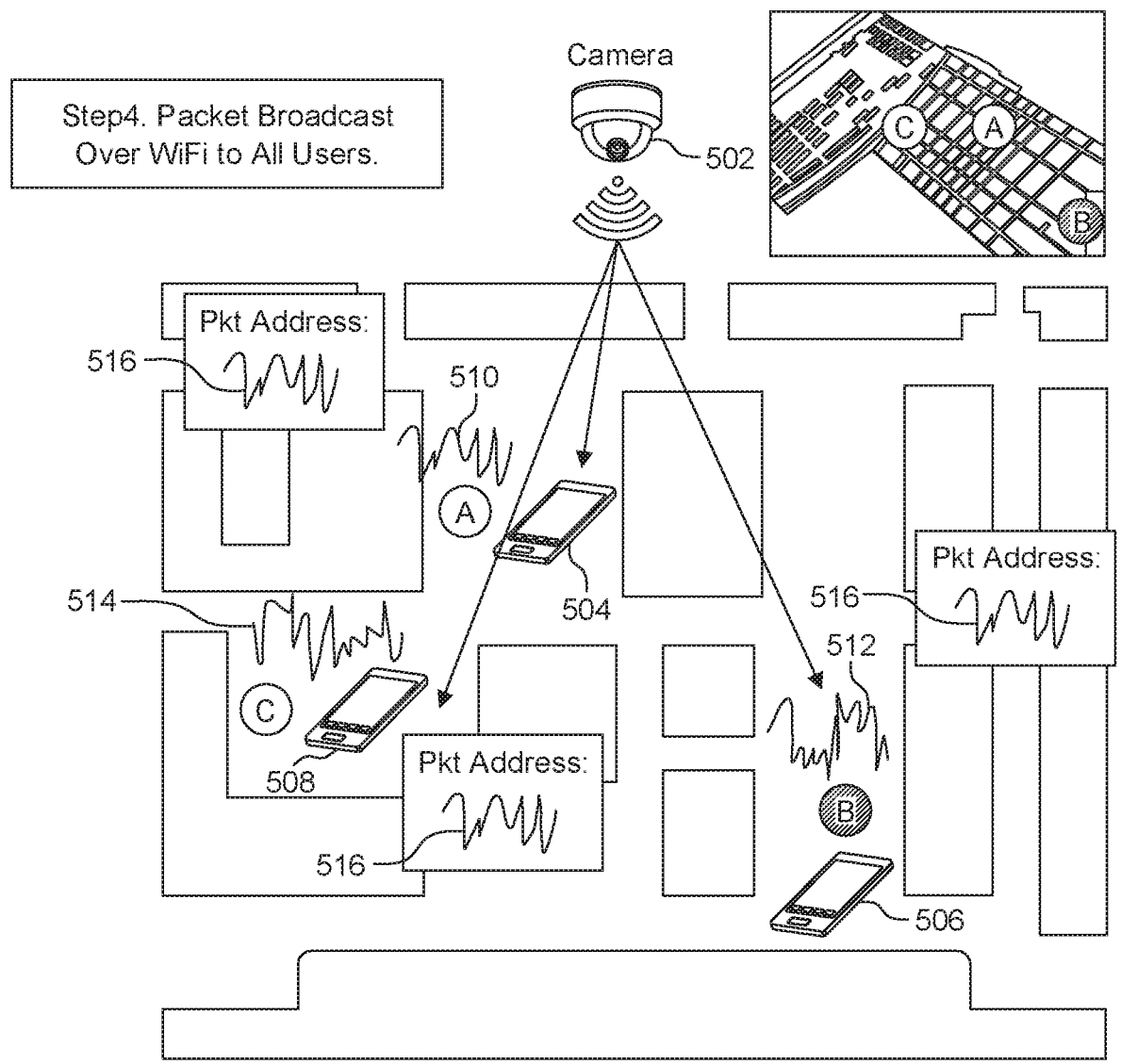
FIG. 5D illustrates the example layout of the retail store from FIG. 5A, the three example signals from FIG. 5B, and additionally illustrates the example data packet from FIG. 5C being broadcast in accordance with some embodiments.

FIG. 5D illustrates the example layout of the retail store from FIG. 5A, the three example signals 510, 512, 514 from FIG. 5B, and additionally illustrates the example data packet from FIG. 5C being broadcast in accordance with some embodiments. The data packet is broadcast (to, e.g., all users, e.g., in range) such that the mobile device 504 of the first user 505, the mobile device 506 of the second user 507, and the mobile device 508 of the third user 509 may receive the data packet. Because the first user 505 is at <X3, Y6>, the mobile device 504 of first user 505 is the intended receiver of the data packet.

Figure 5E:
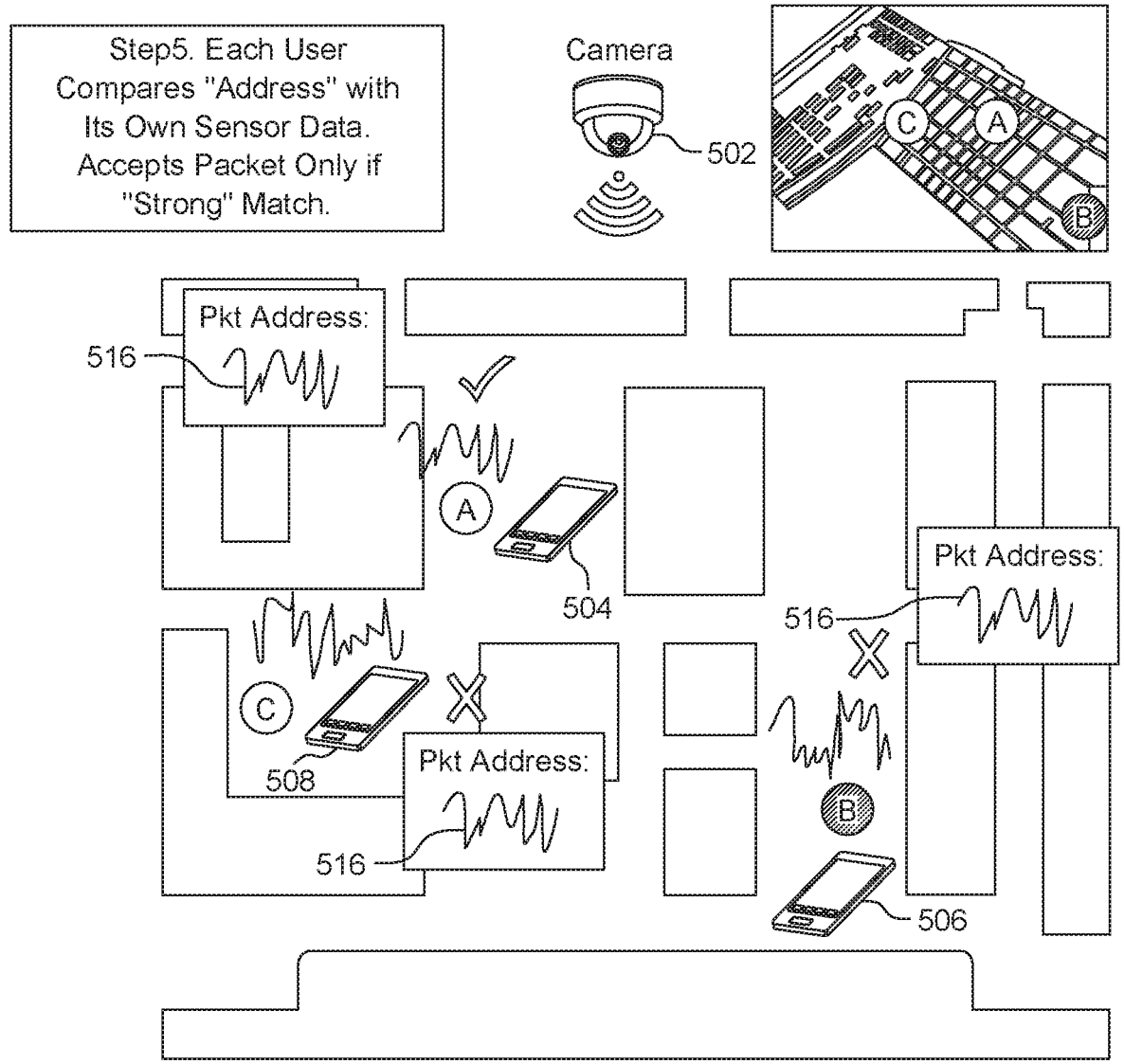
FIG. 5E illustrates the example layout of the retail store from FIG. 5A, the three example signals from FIG. 5B, and additionally illustrates the address of the data packet being compared to each user's user-device sensor data in accordance with some embodiments.

FIG. 5E illustrates the example layout of the retail store from FIG. 5A, the three example signals from FIG. 5B, and additionally illustrates the address 516 of the data packet being compared to each user's user-device sensor data in accordance with some embodiments. Because the mobile device 504 of the first user 505 is the intended recipient of the data packet, the destination address 516 of the data packet matches the mobile-device-sensed ambient-signal data 510 for the first user 505. Each mobile device may be configured to accept the data packet if a comparison of the destination address of the data packet to the mobile-device-sensed ambient-signal data is greater than a threshold matching score.

Another example implementation of the described systems and methods in accordance with some embodiments is for a car to send a message to another car and/or for communication between cars. For example, two cars may be able to communicate on the road without any knowledge of each other's MAC/IP address. Instead, they may measure and use the ambient signals as a temporary ID.

Figure 6:
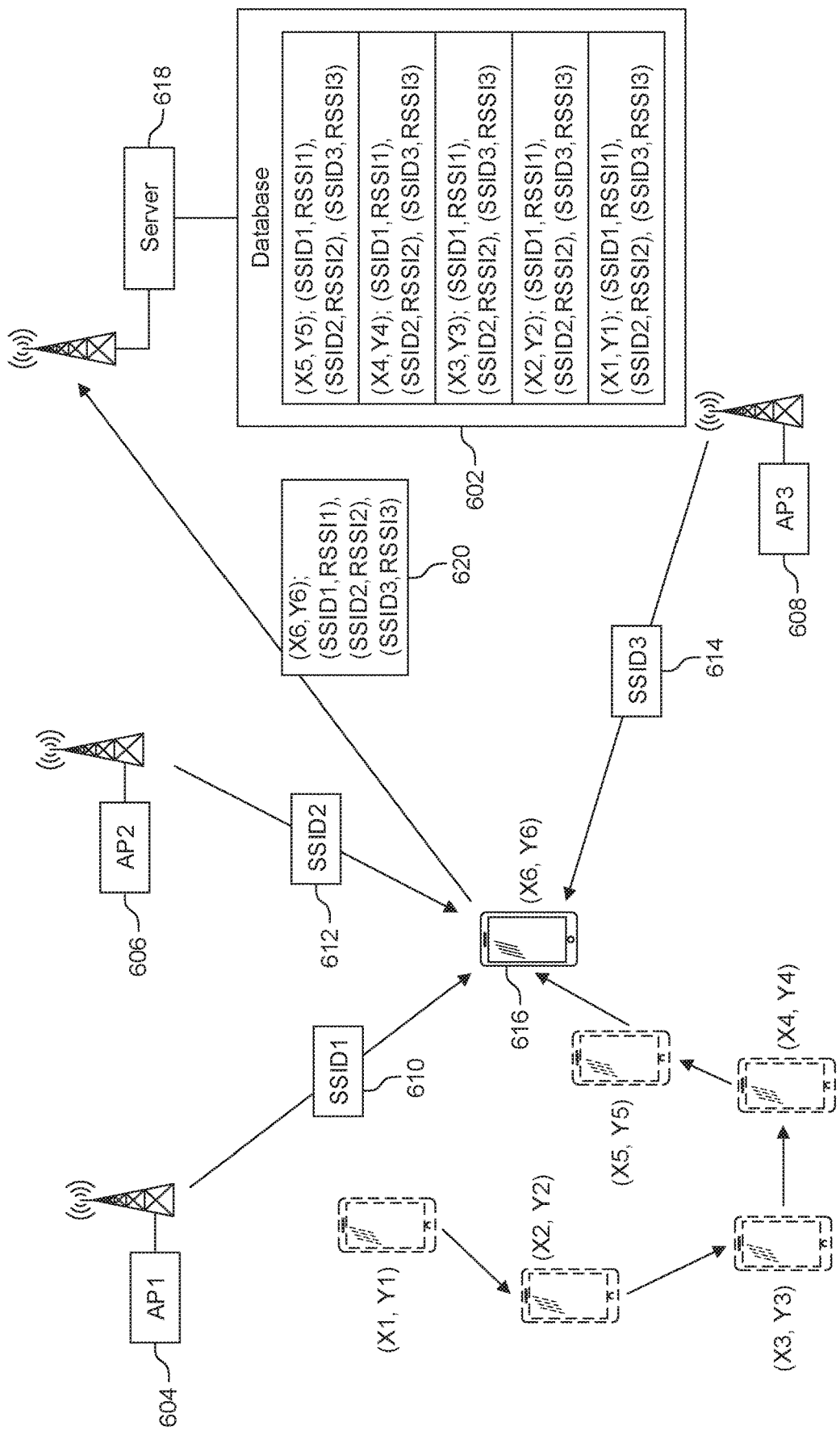
FIG. 6 illustrates an example map being created or updated in accordance with some embodiments.

FIG. 6 illustrates an example map being created or updated in accordance with some embodiments. FIG. 6 may represent a configuration stage of an exemplary embodiment where signal levels (e.g. the strength of signals from various access points) are measured at a plurality of locations and stored in a lookup table. After the configuration stage, each location may be mapped to a corresponding plurality of measured signal levels measured at the respective location.

A database may store, for each of a plurality of locations, a corresponding plurality of measured wireless signal levels measured at the respective location. As illustrated in FIG. 6, a database 602 stores, for each of locations (X1, Y1), (X2, Y2), (X3, Y3), (X4, X4), and (X5, Y5), a corresponding plurality of measured wireless signal levels including pairs of SSIDs and corresponding RSSI values measured at the respective location. For example, for location (X1, Y1), the database 602 stores a plurality of measured wireless signal levels including pairs of SSIDs and corresponding RSSI values for each of wireless access points AP1 604, AP2 606, and AP3 608 measured at location (X1, Y1).

One or more devices may be used at each location to measure wireless signal levels at the respective location. For example, while a mobile device 616 is located at location (X1, Y1), the mobile device 616 may measure a plurality of wireless signal levels. The mobile device 616 may output the measured plurality of wireless signal levels measured at location (X1, Y1) for storage in the database 602. For example, the mobile device 616 may wirelessly transmit the measured plurality of wireless signals measured at location (X1, Y1) to a server 618 that is communicatively coupled to the database 602.

As illustrated in FIG. 6, a mobile device 616 is currently located at (X6, Y6) and was previously located at locations (X1, Y1), (X2, Y2), (X3, Y3), (X4, X4), and (X5, Y5). While at each of locations (X1, Y1), (X2, Y2), (X3, Y3), (X4, X4), and (X5, Y5), the mobile device 616 measured a corresponding plurality of wireless signal levels. In the database 602, each plurality of measured wireless signal levels may be stored with the corresponding location at which the wireless signal levels were measured. While at location (X6, Y6), the mobile device may measure RSSI values for each wireless access point AP1 604, AP2 606, and AP3 608 and may obtain, for each wireless access point AP1 604, AP2 606, and AP3 608, a corresponding SSID (respectively, SSID1 610, SSID2 612, and SSID3 614). The mobile device 616 may then transmit the measured RSSI values and corresponding SSIDs measured at (X6, Y6) and the location (X6, Y6) 620 for addition to the database 602. This information may be added to the database 602 to continue or complete creation of a map of measured signal levels and corresponding locations or to update an already created map of measured signal levels and corresponding locations. The location associated with each ambient signal measurement may be determined using a camera which observes the user of the mobile device traversing the locations as the signal measurements are captured and/or relayed to the server, or the locations may be determined using another available localization system (e.g. GPS, beacon-based locations, etc).

In some embodiments, a map of ambient signals corresponding to a region may change over time. For example, in some embodiments, the map may include one or more ambient signal measurements for one or more ambient signal types measured at one or more locations of the region. For example, in some embodiments, at a location L (e.g., which may be in or near a retail environment (e.g., a store), a non-retail environment (e.g., home), and/or some other environment), for which ambient signal measurement(s) are stored, at least one of the ambient signal measurement(s) may no longer be an adequate representation of ambient signals for the location L. In other words, in some embodiments, the map may include ambient signal measurements for the location L, and since a time that the ambient signal measurements were stored, changes to one or more of the ambient signals for location L may have occurred such that if the ambient signals were now measured at the location L, the ambient signal measurements would be different than those ambient signal measurements previously measured.

In some embodiments, the map may be updated (e.g., periodically) so that the previously measured ambient signals for a location (e.g., the location L) are replaced with more recently measured ambient signal measurements. In some embodiments, the map may be updated using or based on information received from some of the mobile devices of the users. For example, in some embodiments, a system, e.g., a store's system, may send out toothpaste coupons that are intended to be received by mobile devices of users detected at a toothpaste display in the store. In some embodiments, the store's system may send out the toothpaste coupons using an ambient signal signature for a location of the toothpaste display. In some embodiments, the mobile devices of the users that receive the toothpaste coupon may be configured to, e.g., responsively or proactively transmit ambient signal summary data. In some embodiments, the ambient signal summary data may be and/or may be indicative of some or all of the ambient signal measurement(s) that a particular mobile device is configured to measure. In some embodiments, the ambient signal summary data may serve as a trigger for the store's system to use a different ambient signal signature and/or re-measure some or all of the ambient signal types for the location and/or otherwise update the mapping of the map of ambient signal measurements to the location.

In some embodiments, ambient signal data corresponding to a location may change. For example, ambient signal data may be mapped to a location, and some or all of the ambient signal data mapped to the location may change after the ambient signal data has been mapped to the location, e.g., some or all of the ambient signal data mapped to the location may become stale (e.g., may no longer be accurate for the location). In some embodiments, a map of ambient signal data may be updated (e.g., periodically) to, e.g., minimize or eliminate stale ambient signal data from the map. For example, a magnetic field intensity and/or a WiFi signal strength corresponding to a location may have changed since the magnetic field intensity and/or the WiFi signal strength corresponding to the location was mapped (e.g., most recently mapped) to the location, and the mapping of the magnetic field intensity and/or the WiFi signal strength to the location may currently be stale. In some embodiments, the stale ambient signal data corresponding to the location may be updated, e.g., by measuring (e.g., re-measuring) ambient signal data at the location and/or updating the map of the ambient signal data to the location with the newly measured ambient signal data. For example, in some embodiments, if the ambient signal data mapped to the location includes a plurality of ambient signal levels for a plurality of ambient signal types (e.g, magnetic field intensity, WiFi signal strength, 3G, 4G, 5G, etc.), ambient signal levels for some or all of the ambient signal types may be updated.

In some embodiments, the ambient signal data may be updated based on wireless message receipt data. The ambient signal data may be updated, e.g., in response to a message including the wireless message receipt data being received, e.g., at a system. The wireless message receipt data may be received from, e.g., a mobile device. In some embodiments, ambient signal data that is stable (e.g., has not changed since the most recent measurement or has not changed over some other period of time) and/or ambient signal data that is stale may be, e.g., determined from and/or based on the wireless message receipt data. For example, the system may receive wireless message receipt data corresponding to transmitted wireless messages that each included a specific magnetic signature for a location, and the system may determine from the wireless message receipt data that the specific magnetic signature for the location has changed. For example, if above a threshold number of intended recipient mobile devices that receive the wireless message fail to present a message indicative of message content of the transmitted wireless message, then the system may determine that the specific magnetic signature for the location has changed. The system may, for example, responsively update a database or map, e.g., so as to use another signature for the location (e.g., possibly using additional or alternative ambient signal data types).

Another example implementation of the described systems and methods in accordance with some embodiments is for people to communicate with each other without providing address information. For example, people in a social gathering in a known environment may send messages to each other without knowing each other. Users in an environment may have maps of the environment and can choose to send a message to a person located at a particular point on the map. For example, users Bob and Alice (e.g., who may be users of a dating application) may be in a pub, and Bob may have a map of the pub. Bob may want to message a person that is standing in front of the pub's juke box, for example, without having to walk over to that person and/or interrupting that person from listening to a song. Bob may select to send a message to the person in front of the juke box, who happens to be the user Alice. While Alice is in front of the juke box, Alice's mobile phone may be measuring one or more wireless signal levels. For Bob's message to be sent to the person in front of the juke box (Alice), one or more previously-measured wireless signal levels measured in front of the juke box may be obtained and the message, with the one or more previously-measured wireless signal levels included as an ad hoc address, may be broadcast in the pub (e.g., to mobile devices in the pub). Assuming Alice's mobile device is configured to receive the broadcast message and measured one or more wireless signal levels while located in front of the juke box, if at least one of the one or more previously-measured wireless signal levels are sufficiently close to at least one of the one or more Alice's-mobile-device-measured wireless signal levels, Alice's mobile device may provide the message to Alice.

At least some embodiments of systems and methods described herein allow for extremely high location accuracy, and the accuracy is robust and scalable.

At least some embodiments of systems and methods described herein are immediately deployable, potentially with surveillance cameras.

At least some embodiments of systems and methods described herein preserve privacy of the user.

At least some embodiments of systems and methods described herein allow for one application to work for many different stores.

At least some embodiments of systems and methods described herein are employable without users having to install separate applications for each store.

At least some embodiments of systems and methods described herein work for both indoor and outdoor settings.

At least some embodiments of systems and methods described herein allow for users to be localized even when they are static.

At least some embodiments of systems and methods described herein allow for localization for small areas of a shopping floor and/or the entire shopping floor.

Some embodiments may operate using surveillance cameras are already installed. In other embodiments, new cameras may need to be installed but that typically adds value to a retail store. The surveillance video feeds may be streamed to a server.

Systems and methods described herein in accordance with some embodiments may be employed for performing analytics of the user locations and thereby offer motion analytics services (e.g., determine how many people paused for more than 10 seconds at the toothpaste aisle).

In at least some embodiments, the ad hoc address for communication is designed so as to work across various (heterogeneous) phone platforms.

In at least some embodiments, the database is updated periodically. For example, the database may be updated (in part or in whole) at some periodicity (e.g., once a month). How often the database is updated may depend on a number of factors, such as, for example, how static the ambient signals are over time, the size of the environment, changes to the environment (e.g., changes effecting ambient signals at locations in the environment, changes to the floorplan, addition or removal of objects in the environment), the number of ambient signals for which data is maintained, and/or among others.

Systems and methods described herein in accordance with some embodiments may determine population analytics, such as "how many people paused more than 10 seconds at the toothpaste aisle". Such data may be desirable to an entity offering location-based services.

In some embodiments, the ad hoc address of a user includes not just sensor data (e.g. RSSI levels) but also a time value T. A user may have many such ad hoc address, each of which may be represented in some embodiments as a tuple $<T_n, SensorData_n>$. In such embodiments, a message may be directed to a user who was detected at a particular location at a particular time. A broadcast message may include an ad hoc address of the form $<T_1, SensorData_1>$, where $T_1$ represents a past moment in time and SensorData$_1$ represents the sensor data (e.g. signal levels) measured at that user's mobile device at time $T_1$. Ad hoc addresses of this form may allow, for example, persistent communication with a particular user even if that user may, from time to time, be positioned at a location that is not characterized by a unique set of sensor data.

In some embodiments, ad hoc addresses as described herein may be used in two-way communication between the user and the operator of the system. For example, a user may operate his mobile device to wirelessly transmit a message, with the mobile device's ad hoc address being used as a sender address. For example, at time $T_2$, a user may send from a mobile device a message that includes an ad hoc sender address of the form <$T_2$, SensorData$_2$>. In some embodiments, the system may provide a customized response based on a location of the user as determined by SensorData$_2$ (with the assistance, in some embodiments, of camera data). The customized response may be sent to the ad hoc address <$T_2$, SensorData$_2$>. Even if the mobile device has moved to a new location where it is measuring different sensor data (e.g. SensorData$_3$), the device presents the response message to the user in response to a determination that the device was measuring SensorData$_2$ at time $T_2$.

In some embodiments, a database that correlates locations with sets of sensor data may be populated, updated, and/or refined based on information collected by a plurality of users (e.g. store customers).

Figure 7:
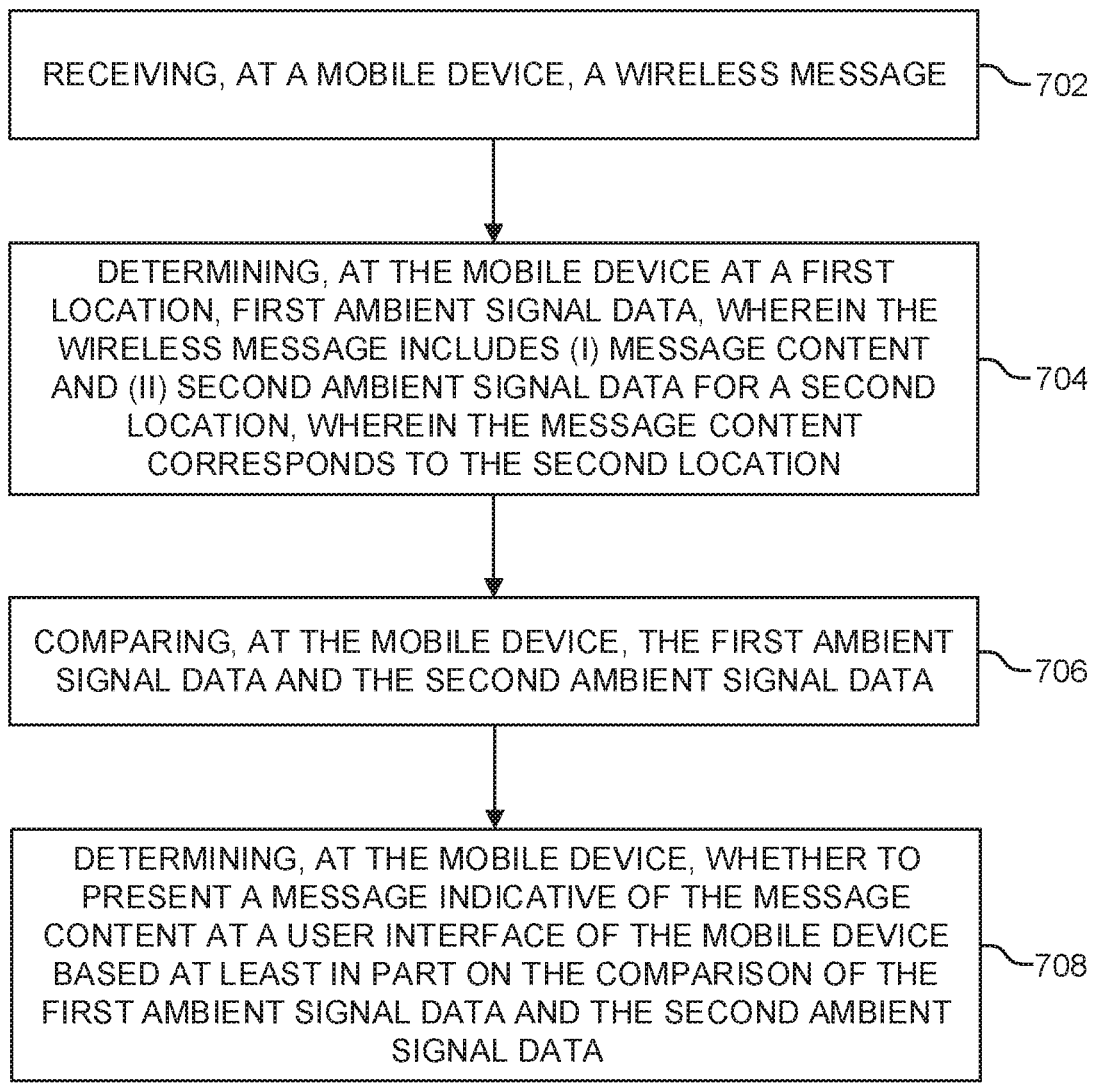
FIG. 7 is a flowchart illustrating an example process in accordance with some embodiments.

FIG. 7 is a flowchart illustrating an example process 700 in accordance with some embodiments. The example process 700 may include receiving 702, at a mobile device, a wireless message. The mobile device may be, for example, mobile device 102 of FIG. 1, computing device 202 of FIG. 2, or the WTRU 902 of FIG. 9, etc. The example process 700 may include determining 704, at the mobile device at a first location, first ambient signal data. The wireless message may include (i) message content and (ii) second ambient signal data for a second location. The message content may correspond to the second location. The example process 700 may include comparing 706, at the mobile device, the first ambient signal data and the second ambient signal data. The example process 700 may include determining 708, at the mobile device, whether to present a message indicative of the message content at a user interface of the mobile device based at least in part on the comparison of the first ambient signal data and the second ambient signal data.

In some embodiments, the process 700 may include, for example, determining, at the mobile device at the first location, third ambient signal data. The wireless message may further include, for example, fourth ambient signal data for the second location. Determining 708, at the mobile device, whether to present the message indicative of the message content at the user interface of the mobile device may be, for example, further based at least in part on a comparison of the third ambient signal data and the fourth ambient signal data.

In some embodiments, the first ambient signal data may include, for example, a first plurality of ambient signal levels for a plurality of ambient signal types and the second ambient signal data may include, for example, a second plurality of ambient signal levels for the plurality of ambient signal types. As discussed above, examples of ambient signals in accordance with some embodiments include magnetic field direction, magnetic field intensity, magnetic field relative change, light intensity, WiFi, service set identifier (SSID), 3G, 4G, and 5G, but it will be understood other ambient signals may be sensed, measured, or otherwise used. Comparing 706, at the mobile device, the first ambient signal data and the second ambient signal data may include, for example, comparing, for each ambient signal type of the plurality of ambient signal types, respective ambient signal levels of the first and second pluralities of ambient signal levels. In some embodiments, determining 708 whether to present the message indicative of the message content at the user interface of the mobile device may include, for example: presenting the message indicative of the message content based on an aggregate ambient signal comparison value exceeding a threshold, the aggregate ambient signal comparison value resulting from comparing, for each ambient signal type of the plurality of ambient signal types, respective ambient signal levels of the first and second pluralities of ambient signal levels.

For example, as discussed above, in some embodiments, an aggregation of ambient signal data, values, levels, or information, may be used to determine a measure of similarity between ambient signals sensed at the mobile device and ambient signals (or signal information) sent to the mobile device. This measure of similarity may be compared to a threshold to determine an acceptable match at the mobile device between sensed information at the mobile device and information received at the mobile device. If the threshold is exceeded, a message may be presented to a user.

In some embodiments, determining 704 the first ambient signal data might include, for example, determining the first ambient signal data prior to receiving the wireless message. For example, in some embodiments, the mobile device may be configured to sense ambient signals from the environment without, e.g., receiving a wireless message, from, e.g., a location-based communication system (e.g., location-based communication system 104 of FIG. 1, system 404 of FIG. 4), to, e.g., save processing time or reduce battery drain. In some embodiments, the mobile device may be configured to sense ambient signals responsively to entering a particular environment, e.g., the store described above in connection with FIGS. 5A-5E.

In some embodiments, determining 704 the first ambient signal data might include, for example, determining the first ambient signal data responsive to receiving the wireless message. For example, in some embodiments, the mobile device may be configured to sense ambient signals from its surrounding environment without, e.g., receiving a wireless message from, e.g., a location-based communication system (e.g., location-based communication system 104 of FIG. 1, system 404 of FIG. 4), but may be configured to sense a particular type of ambient signal upon a trigger from the received wireless message. In some embodiments, the mobile device may update its sensory readings (e.g., from sensor 218 of FIG. 2, which may include an e-magnetometer, a light sensor, an e-barometer, an e-compass, an antenna, a microphone, a humidity sensor, a chemical sensor, and/or any other suitable sensor(s)) (e.g., for one or more ambient signals) upon receiving the message. In some embodiments, the mobile device may be configured in such a way that (e.g., to conserve battery, etc.) the mobile device may not sense ambient signals until a trigger is received, e.g., receipt of the wireless message.

In some embodiments, the wireless message may include a wireless broadcast message and the second ambient signal data may serve as a destination address for the wireless broadcast message. For example, in some embodiments, the second ambient signal data may be an ad hoc address for the mobile device.

In some embodiments, determining 708 whether to present the message indicative of the message content at the user interface of the mobile device may include, for example, presenting the message indicative of the message content only if a match is determined between the first ambient signal data and the second ambient signal data.

In some embodiments, the message indicative of the message content may include, for example, advertising content. The advertising content may correspond to a product featured at the second location. In some embodiments, the message indicative of the message content may include an offer or targeted information. The message indicative of the message content may be, e.g., for commercial purposes and content, but, of course, other purposes and content may be used instead or in combination, such as personal purposes, e.g., initiating contact with a friend (or a stranger) across a crowded room, emergency warnings, helpful suggestions, reminders, and any other purposes.

In some embodiments, the second location may be, for example, determined from camera data.

In some embodiments, the process 700 may include, for example, sending an acknowledgement message to an address associated with the wireless message. The acknowledgement message may be, for example, indicative of at least one of: receipt by the mobile device of the wireless message, confirmation by the mobile device that the first ambient signal data was a match to the second ambient signal data, or confirmation that the message indicative of the message content was presented at the user interface of the mobile device.

In some embodiments, receiving 702 the wireless message may include, for example, receiving the wireless message without providing an internet protocol (IP) address of the mobile device to a device that sent the wireless message. For example, in some embodiments, the mobile device may be configured to receive the wireless message from a device, e.g., system 104 of FIG. 1, network entity 190 of FIG. 3, system 404 of FIG. 4, without the device having received, e.g., from the mobile device, an IP address of the mobile device.

In some embodiments, the wireless message may, for example, not include a network address of the mobile device. For example, in some embodiments, the mobile device may be configured to receive from a system or device, e.g., system 104 of FIG. 1, network entity 190 of FIG. 3, system 404 of FIG. 4, when in range, a wireless message that is broadcast.

In some embodiments, the second ambient signal data may include, for example, a set of previously surveyed ambient signal data associated with the second location. The set of previously surveyed ambient signal data may include, for example, data from at least one ambient signal from the group consisting of: magnetic field direction, magnetic field intensity, magnetic field relative change, light intensity, WiFi, service set identifier (SSID), 3G, 4G, and 5G. For example, in some embodiments, the set of previously surveyed ambient signal data associated with the second location may be obtained from, e.g., a database or map (e.g., database 110 of FIG. 1, data storage 196 of FIG. 3, map 406 of FIG. 4, and database 602 of FIG. 6). For example, in some embodiments, the database or map may include, e.g., previously surveyed signal data associated with a location that was obtained, e.g., as described above in connection with FIG. 6.

In some embodiments, the process 700 may include, for example, receiving a second wireless message including third ambient signal data; determining that the first ambient signal data does not match the third ambient signal data; and responsive to determining the first ambient signal data does not match the third ambient signal data, filtering out the second wireless message. In some embodiments, filtering out a message may include, e.g., discarding a message, failing to present a message to a user interface of a mobile device, allowing a message to timeout, rejecting a message, etc.

In some embodiments, determining 708 whether to present the message indicative of the message content at the user interface of the mobile device may include, for example, determining an acceptable match between the first ambient signal data and the second ambient signal data, and responsive to determining the acceptable match, causing the message indicative of the message content to be presented at the user interface of the mobile device. The message indicative of the message content may include, for example, the message content.

In some embodiments, the wireless message may further include, for example, time interval data representative of a time interval when the second ambient signal data for the second location is unique with respect to the second location. In some embodiments, determining 704 the first ambient signal data may include, for example, sensing the first ambient signal data using a sensor device and recording a time value for the first ambient signal data. In some embodiments, comparing the first ambient signal data and the second ambient signal data may include, for example, comparing the time value for the first ambient signal data with the time interval in the wireless message.

In some embodiments, the first ambient signal data may include, or may be used as, mobile-device address information, while the second ambient signal data may include, or may be used as, recipient-device address information that is part of a message received by the mobile device and that is used to direct the message to the mobile device.

In some embodiments, the process 700 may include, for example, transmitting, from the mobile device, wireless message receipt data corresponding to the wireless message. The wireless message receipt data may be, for example, indicative of at least one of: the message content of the wireless message, the message indicative of the message content, the first ambient signal data, the second ambient signal data, the comparison of the first ambient signal data and the second ambient signal data, or the determination of whether to present the message indicative of the message content. For example, in some embodiments, the wireless message receipt data may include the message content of the wireless message, the message indicative of the message content, the first ambient signal data, the second ambient signal data, an indication of whether the comparison resulted in a match, an indication of whether the message indicative of the message content was presented, an indication of one or more ambient signal data types for which there was or was not a match, and/or an indication of a closeness of a match (if any). In some embodiments, the mobile device may be, e.g., configured to transmit the wireless message receipt data in response to an outcome and/or occurrence of an event, such as, for example, the comparison of the first ambient signal data and the second ambient signal and/or the determination of whether to present the message indicative of the message content. In some embodiments, the mobile device may be, e.g., configured to transmit the wireless message receipt data regardless of the outcome of such events. In some embodiments, particular data may be, included in the wireless message receipt data based on an outcome and/or occurrence of an event. In some embodiments, the wireless message receipt data may be used to update a database or map (e.g., database 110 of FIG. 1, data storage 196 of FIG. 3, map 406 of FIG. 4, and database 602 of FIG. 6). For example, in some embodiments, the mobile device may be configured to transmit the wireless message receipt data to a system or device, e.g., system 104 of FIG. 1, network entity 190 of FIG. 3, system 404 of FIG. 4, and the system may be configured to update a database or map based on or using at least some of the wireless receipt data. In some embodiments, the mobile device may be configured to, e.g., in addition to or instead of the wireless message receipt data, send proactive wireless message data. In some embodiments, the proactive wireless message data may be sent periodically and/or responsive to an event that does not include receipt of a prior message.

Figure 8:
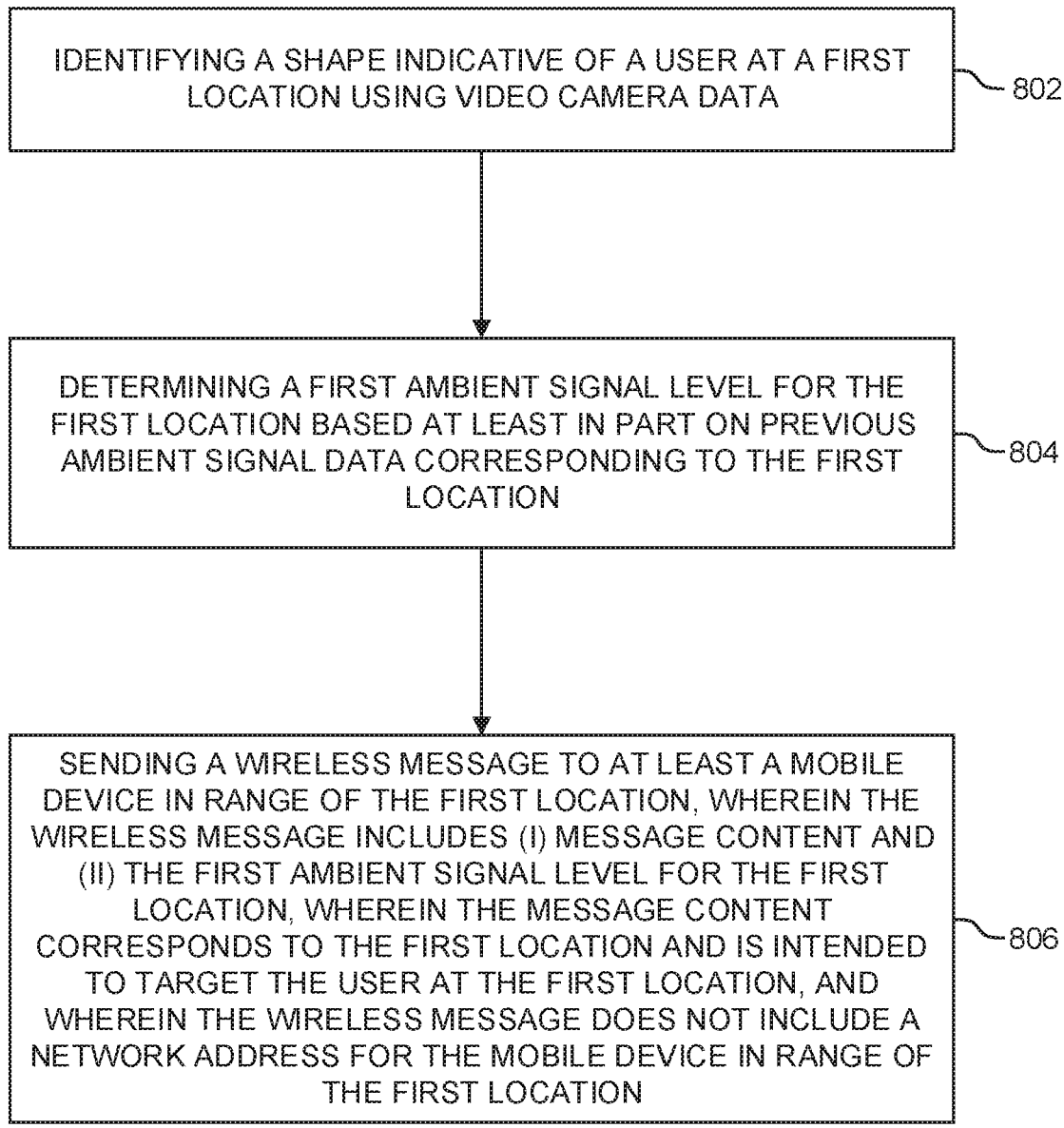
FIG. 8 is a flowchart illustrating an example process in accordance with some embodiments.

FIG. 8 is a flowchart illustrating an example process 800 in accordance with some embodiments. The example process 800 may include identifying 802 a shape indicative of a user at a first location using video camera data. The example process 800 may include determining 804 a first ambient signal level for the first location based at least in part on previously surveyed ambient signal data corresponding to the first location. The example process 800 may include sending 806 a wireless message to at least a mobile device in range of the first location. The wireless message may include (i) message content and (ii) the first ambient signal level for the first location. The message content may correspond to the first location and may be intended to target the user at the first location. The wireless message may not include a network address for the mobile device in range of the first location.

In some embodiments, the message may include a wireless broadcast message and the second ambient signal level may serve as a destination address for the wireless broadcast message.

In some embodiments, identifying 802 the shape indicative of the user at the first location using the video camera data might include, for example, receiving camera data from a video camera, analyzing the camera data to detect a blob representative of the user, and localizing the blob at the first location.

In some embodiments, identifying a shape indicative of a user might depend on the type of identification being performed. For example, a video camera may capture images of an area and a shape (e.g., a blob) spotted in the visual range of the camera might be interpreted as indicative of a user. Depending on a particular resolution of the equipment used the shape indicative of the user may clearly and identifiably be a visible image of the user.

In some embodiments, the example process 800 may include, for example, determining the message content of the wireless message based at least in part on the first location.

In some embodiments, determining 804 the first ambient signal level for the first location might include, for example, determining a location of a second user at a second location, obtaining previously surveyed ambient signal data for the second location, determining the first ambient signal level for the first location based on a difference between the previously surveyed ambient signal data for the second location and the previously surveyed ambient signal data for the first location.

In some embodiments, the example process 800 may include, for example, obtaining the previously surveyed ambient signal data for the first location. Obtaining the previously surveyed ambient signal data for the first location may include, for example, at least one of receiving the previously surveyed ambient signal data from a database storing a mapping of the previously surveyed ambient signal data to the first location, or determining the previously surveyed ambient signal data by previously measuring ambient signal data at the first location.

In some embodiments, sending 806 the wireless message may include, for example, broadcasting the wireless message using a destination address of a mobile device of the user at the first location. The destination address may include the first ambient signal level for the first location and a time interval during which the first ambient signal level for the first location is unique at the first location, and the wireless message may include the destination address.

In some embodiments, the example process 800 may include, for example, obtaining, from at least the mobile device in range of the first location, wireless message receipt data corresponding to the wireless message, and updating, based on the wireless message receipt data, a mapping of the previously surveyed ambient signal data to the first location. For example, in some embodiments, the wireless message receipt data may be received from, e.g., at least the mobile device in range of the first location, and responsive to the wireless message receipt data being received, based on and/or using some or all of the wireless message receipt data, a database or map may be updated. For example, in some embodiments, the wireless message receipt data may be used to determine, e.g., whether at least some of ambient signal data mapped to a location may be stale or may be stable. For example, in some embodiments, determining that ambient signal data mapped to a location is stale may trigger an update of the mapping of the ambient signal data to the location. For example, in some embodiments, ambient signal data may be re-measured at the location and the re-measured ambient signal data may be mapped to the location and/or one or more different types of ambient signal data measured at the location may be mapped to the location.

In some embodiments, the example process 800 may include, for example, updating (e.g., periodically) a mapping of ambient signal data (e.g., previously surveyed ambient signal data) corresponding to the first location.

In some embodiments, the mobile device and/or the system may be or may include a portable device such as a home automation hub (which may also be referred to as a smart-home hub) that, e.g., is configured to communicate wirelessly, at least in part. It should understood that such a wireless portable device might not be a "home" device but might be used in another environment. In some embodiments, for example, even though in some contexts a "home" automation hub might not be thought of as a typical mobile device, such devices may be portable and may be, e.g., moved from room to room of a house or other location by a user to, e.g., facilitate use of the home automation hub itself or in conjunction with IOT-capable devices or other "home"-networked devices.

In some embodiments, the "home" automation hub may carry out, in whole or in part, systems and methods in accordance with some embodiments. For example, in some embodiments, the home automation hub may communicate with, e.g., a smart-home device, e.g., by transmitting and/or receiving one or more wireless messages that may include ambient signal data for a location associated with the smart-home device. For example, in some embodiments, the ambient signal data may serve as a communication address (e.g., a destination address) for the one or more wireless messages.

In some embodiments, a method of presenting a targeted offer on a mobile device may include: determining first location information from sensor data of the mobile device; receiving second location information and information regarding an offer from a location-based communication system, wherein the location-based communication system broadcasts the second location information and the information regarding the offer to a plurality of mobile devices; and responsive to a determination that the first location information matches the second location information, presenting, on the mobile device, the information regarding the offer.

In some embodiments, the method may further include: transmitting, at the mobile device, a message including a sender address, the sender address being the first ambient signal level. In some embodiments, the mobile device may use its own ambient signal readers as a sender address.

In some embodiments, a method may include: measuring, at a mobile device while the mobile device is at a location, ambient-signal levels of one or more ambient signals; receiving, at the mobile device, a message that includes surveyed ambient-signal levels and message content, the message being transmitted by a remote device to a set of one or more mobile devices, the set including the mobile device; and responsive to a comparison between the measured ambient-signal levels and the surveyed ambient-signal levels being within a threshold matching value, presenting the message content with the mobile device.

In some embodiments, the method may further include, responsive to a comparison between the measured ambient-signal levels and the surveyed ambient-signal levels not being within the threshold matching value, discarding the message.

In some embodiments, the method may further include performing a matching operation.

In some embodiments, the method may further include determining an edit distance between the measured ambient-signal levels and the surveyed ambient-signal levels.

In some embodiments, the method may further include determining a Hamming distance between the measured ambient-signal levels and the surveyed ambient-signal levels.

In some embodiments, the measured ambient-signal levels and the surveyed ambient-signal levels may be the same.

In some embodiments, the measured ambient-signal levels and the surveyed ambient-signal levels may be substantially similar.

In some embodiments, measuring, at the mobile device while the mobile device is at the location, the ambient-signal levels may include determining an RSSI value and/or obtaining an SSID.

In some embodiments, the first location information and the second location information may be based on sensed ambient signals.

In some embodiments, the message may be received over a wireless medium.

In some embodiments, the message content may be based on the location.

In some embodiments, the message content may include information for an item associated with the location.

In some embodiments, the ambient-signal levels may be measured at the mobile device at a first time. In some embodiments, the surveyed ambient-signal levels may correspond to a survey of the location performed at a second time that is different than the first time. In some embodiments, the second time may be earlier in time than the first time.

In some embodiments, a method may include: determining a location of a user in an environment; obtaining ambient-signal data corresponding to the determined location of the user; determining, based on the obtained ambient-signal data, a destination address for a message; and outputting the message with the destination address for receipt by a set of one or more mobile devices, the set including a mobile device of the user.

In some embodiments, determining a location of a user in an environment may include capturing video of the user in the environment.

In some embodiments, determining a location of a user in an environment may include localizing the user in the environment with a camera.

In some embodiments, the method may further include updating the ambient-signal data.

In some embodiments, the method may further include generating the message.

In some embodiments, the message may be generated based on the determined location of the user in the environment.

In some embodiments, the message may be generated based on characteristics associated with the determined location of the user in the environment.

In some embodiments, the method may further include: determining a location of another user in the environment; and obtaining ambient-signal data corresponding to the determined location of the other user.

In some embodiments, a system may include: a camera configured to determine a location of a user in an environment; a server configured to: obtain ambient-signal data corresponding to the determined location of the user; determine, based on the obtained ambient-signal data, a destination address for a message; and mark the message with the destination address; and a transmitter configured to outputting the marked message for receipt by a mobile device of the user.

In some embodiments, a system may include a processor and a non-transitory storage medium storing instructions operative, when executed on the processor, to perform functions that may include: determining, at a mobile device, first location information from sensor data of the mobile device; receiving second location information and offer information, the second location information and the offer information being transmitted by a remote device to a set of one or more mobile devices, the set including the mobile device; and responsive to a comparison between the first location information and the second location information being within a threshold matching value, presenting the offer with the mobile device.

In some embodiments, a method may include: detecting, at a mobile device, ambient signals in an environment; determining mobile-device address information from the detected ambient signals; receiving, at the mobile device, a data packet having a destination address based on ambient signals detected by a device other than the mobile device; determining the mobile device is an intended recipient device based on a comparison of the mobile-device address information to the destination address; and based on the determination that the mobile device is an intended recipient device, presenting, with the mobile device, information based on the data packet.

In some embodiments, a system may include a processor and a non-transitory storage medium storing instructions operative, when executed on the processor, to perform functions that may include: detecting, at a mobile device, ambient signals in an environment; determining mobile-device address information from the detected ambient signals; receiving, at the mobile device, a data packet having a destination address based on ambient signals detected by a device other than the mobile device; determining the mobile device is an intended recipient device based on a comparison of the mobile-device address information to the destination address; and based on the determination that the mobile device is an intended recipient device, presenting, with the mobile device, information based on the data packet.

In some embodiments, a method may include: detecting, at a mobile device, one or more ambient signals of an environment; determining mobile-device address information from the detected one or more ambient signals; receiving, at the mobile device, recipient-device address information and offer information, the recipient-device address information being determined from an observation of the environment; determining the mobile-device address information is a match with the recipient-device address information; and responsive to determining the mobile-device address information is a match with the recipient-device address information, presenting the offer information.

In some embodiments, a method may include: determining, at a mobile device while the mobile device is at a location, first-device-measured-ambient-signal data for the location; receiving, at the mobile device, a remotely-transmitted data packet including second-device-measured-ambient-signal data and targeted information; comparing, at the mobile device, the first-device-measured-ambient-signal data to the second-device-measured-ambient-signal data; and in response to the comparison indicating a match, presenting, at the mobile device, the targeted information.

In some embodiments, a system may include a processor and a non-transitory storage medium storing instructions operative, when executed on the processor, to perform functions that may include: determining, at a mobile device while the mobile device is at a location, first-device-measured-ambient-signal data for the location; receiving, at the mobile device, a remotely-transmitted data packet including second-device-measured-ambient-signal data and targeted information; comparing, at the mobile device, the first-device-measured-ambient-signal data and the second-device-measured-ambient-signal data; and in response to the comparison indicating a match, presenting, at the mobile device, the targeted information.

In some embodiments, a method may include: determining first location information; receiving second location information; and presenting an offer based on a comparison of the first location information and the second location information.

In some embodiments, a system may include a processor and a non-transitory storage medium storing instructions operative, when executed on the processor, to perform functions that may include: determining first location information; receiving second location information; and presenting an offer based on a comparison of the first location information and the second location information.

In some embodiments, a method may be performed at a mobile device, the method may include: while the mobile device is at a location, measuring signal levels of a plurality of wireless signals; receiving a broadcast message, wherein the broadcast message includes a reported plurality of wireless signal levels and a message body; comparing the measured signal levels with the reported signal levels to detect a match; and only in response to detecting a match, presenting the message body to a user of the mobile device.

In some embodiments, the signal levels may include RSSI values for each of a plurality of wireless access points.

In some embodiments, the measured plurality of wireless signal levels may include a plurality of pairs of SSIDs and corresponding RSSI values.

In some embodiments, comparing the measured signal levels may include determining a sum of absolute differences between the measured and reported signal levels.

In some embodiments, comparing the measured signal levels may include determining a sum of squared differences between the measured and reported signal levels.

In some embodiments, the message body may be an offer for a product available for sale at the location.

In some embodiments, a method may include: for each of a plurality of locations, storing a corresponding plurality of measured wireless signal levels measured at the respective location; and in response to detecting that a targeted recipient is at a selected location, wirelessly broadcasting a message, wherein the broadcast message includes (i) the measured plurality of wireless signal levels corresponding to the selected location and (ii) a message body.

In some embodiments, the method may further include monitoring the selected location with a video camera, wherein detecting that a targeted recipient is at the selected location may include detecting with the video camera that a person is at the selected location.

In some embodiments, the signal levels may include RSSI values for each of a plurality of wireless access points.

In some embodiments, the measured plurality of wireless signal levels may include a plurality of pairs of SSIDs and corresponding RSSI values.

In some embodiments, the message body may be an offer for a product available for sale at the selected location.

In some embodiments, a method may include: for each of a plurality of locations, storing a corresponding set of measured wireless signal levels measured at the respective location; and wirelessly broadcasting a plurality of messages, each message corresponding to a respective one of the plurality of locations, each message including (i) the measured plurality of wireless signal levels corresponding to the respective location and (ii) a message body.

In some embodiments, the message body may include a message relating to the corresponding location.

In some embodiments, the messages may be sent repeatedly on a periodic basis.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary systems and methods disclosed herein in accordance with some embodiments are implemented using one or more wired and/or wireless network nodes, such as a wireless transmit/receive unit (WTRU) or other network entity.

Example Networks for Implementation of the Embodiments

FIG. 9A is a diagram illustrating an example communications system 900 in which one or more disclosed embodiments may be implemented. The communications system 900 may be a multiple access system that provides content, such as voice, data, video, messaging, broadcast, etc., to multiple wireless users. The communications system 900 may enable multiple wireless users to access such content through the sharing of system resources, including wireless bandwidth. For example, the communications systems 900 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 9A, the communications system 900 may include wireless transmit/receive units (WTRUs) 902a, 902b, 902c, 902d, a RAN 904/913, a CN 906/915, a public switched telephone network (PSTN) 908, the Internet 910, and other networks 912, though it will be appreciated that the disclosed embodiments contemplate any number of WTRUs, base stations, networks, and/or network elements. Each of the WTRUs 902a, 902b, 902c, 902d may be any type of device configured to operate and/or communicate in a wireless environment. In some embodiments, WRTUs 902, 902b, 902c, 902d may include, e.g., mobile device 102 of FIG. 1, computing device 202 of FIG. 2, mobile device 402 of FIG. 4, mobile devices 504, 506, 508 of FIGS. 5A-5E, mobile device 616 of FIG. 6, etc. By way of example, the WTRUs 902a, 902b, 902c, 902d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 902a, 902b, 902c and 902d may be interchangeably referred to as a UE.

The communications systems 900 may also include a base station 914a and/or a base station 914b. Each of the base stations 914a, 914b may be any type of device configured to wirelessly interface with at least one of the WTRUs 902a, 902b, 902c, 902d to facilitate access to one or more communication networks, such as the CN 906/915, the Internet 910, and/or the other networks 912. By way of example, the base stations 914a, 914b may be a base transceiver station (BTS), a Node-B, an eNode B, a Home Node B, a Home eNode B, a gNB, a NR NodeB, a site controller, an access point (AP), a wireless router, and the like. While the base stations 914a, 914b are each depicted as a single element, it will be appreciated that the base stations 914a, 914b may include any number of interconnected base stations and/or network elements.

The base station 914a may be part of the RAN 904/913, which may also include other base stations and/or network elements (not shown), such as a base station controller (BSC), a radio network controller (RNC), relay nodes, etc. The base station 914a and/or the base station 914b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 914a may be divided into three sectors. Thus, in one embodiment, the base station 914a may include three transceivers, i.e., one for each sector of the cell. In an embodiment, the base station 914a may employ multiple-input multiple output (MIMO) technology and may utilize multiple transceivers for each sector of the cell. For example, beamforming may be used to transmit and/or receive signals in desired spatial directions.

The base stations 914a, 914b may communicate with one or more of the WTRUs 902a, 902b, 902c, 902d over an air interface 916, which may be any suitable wireless communication link (e.g., radio frequency (RF), microwave, centimeter wave, micrometer wave, infrared (IR), ultraviolet (UV), visible light, etc.). The air interface 916 may be established using any suitable radio access technology (RAT).

More specifically, as noted above, the communications system 900 may be a multiple access system and may employ one or more channel access schemes, such as CDMA, TDMA, FDMA, OFDMA, SC-FDMA, and the like. For example, the base station 914a in the RAN 904/913 and the WTRUs 902a, 902b, 902c may implement a radio technology such as Universal Mobile Telecommunications System (UMTS) Terrestrial Radio Access (UTRA), which may establish the air interface 915/916/917 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 914a and the WTRUs 902a, 902b, 902c may implement a radio technology such as Evolved UMTS Terrestrial Radio Access (E-UTRA), which may establish the air interface 916 using Long Term Evolution (LTE) and/or LTE-Advanced (LTE-A) and/or LTE-Advanced Pro (LTE-A Pro).

In an embodiment, the base station 914a and the WTRUs 902a, 902b, 902c may implement a radio technology such as NR Radio Access, which may establish the air interface 916 using New Radio (NR).

In an embodiment, the base station 914a and the WTRUs 902a, 902b, 902c may implement multiple radio access technologies. For example, the base station 914a and the WTRUs 902a, 902b, 902c may implement LTE radio access and NR radio access together, for instance using dual connectivity (DC) principles. Thus, the air interface utilized by WTRUs 902a, 902b, 902c may be characterized by multiple types of radio access technologies and/or transmissions sent to/from multiple types of base stations (e.g., a eNB and a gNB).

In other embodiments, the base station 914a and the WTRUs 902a, 902b, 902c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 914b in FIG. 9A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 914b and the WTRUs 902c, 902d may implement a radio technology such as IEEE 802.11 to establish a wireless local area network (WLAN). In an embodiment, the base station 914b and the WTRUs 902c, 902d may implement a radio technology such as IEEE 802.15 to establish a wireless personal area network (WPAN). In yet another embodiment, the base station 914b and the WTRUs 902c, 902d may utilize a cellular-based RAT (e.g., WCDMA, CDMA2000, GSM, LTE, LTE-A, LTE-A Pro, NR etc.) to establish a picocell or femtocell. As shown in FIG. 9A, the base station 914b may have a direct connection to the Internet 910. Thus, the base station 914b may not be required to access the Internet 910 via the CN 906/915.

The RAN 904/913 may be in communication with the CN 906/915, which may be any type of network configured to provide voice, data, applications, and/or voice over internet protocol (VoIP) services to one or more of the WTRUs 902a, 902b, 902c, 902d. The data may have varying quality of service (QoS) requirements, such as differing throughput requirements, latency requirements, error tolerance requirements, reliability requirements, data throughput requirements, mobility requirements, and the like. The CN 906/915 may provide call control, billing services, mobile location-based services, pre-paid calling, Internet connectivity, video distribution, etc., and/or perform high-level security functions, such as user authentication. Although not shown in FIG. 9A, it will be appreciated that the RAN 904/913 and/or the CN 906/915 may be in direct or indirect communication with other RANs that employ the same RAT as the RAN 904/913 or a different RAT. For example, in addition to being connected to the RAN 904/913, which may be utilizing a NR radio technology, the CN 906/915 may also be in communication with another RAN (not shown) employing a GSM, UMTS, CDMA 2000, WiMAX, E-UTRA, or WiFi radio technology.

The CN 906/915 may also serve as a gateway for the WTRUs 902a, 902b, 902c, 902d to access the PSTN 908, the Internet 910, and/or the other networks 912. The PSTN 908 may include circuit-switched telephone networks that provide plain old telephone service (POTS). The Internet 910 may include a global system of interconnected computer networks and devices that use common communication protocols, such as the transmission control protocol (TCP), user datagram protocol (UDP) and/or the internet protocol (IP) in the TCP/IP internet protocol suite. The networks 912 may include wired and/or wireless communications networks owned and/or operated by other service providers. For example, the networks 912 may include another CN connected to one or more RANs, which may employ the same RAT as the RAN 904/913 or a different RAT.

Some or all of the WTRUs 902a, 902b, 902c, 902d in the communications system 900 may include multi-mode capabilities (e.g., the WTRUs 902a, 902b, 902c, 902d may include multiple transceivers for communicating with different wireless networks over different wireless links). For example, the WTRU 902c shown in FIG. 9A may be configured to communicate with the base station 914a, which may employ a cellular-based radio technology, and with the base station 914b, which may employ an IEEE 802 radio technology.

FIG. 9B is a system diagram illustrating an example WTRU 902. As shown in FIG. 9B, the WTRU 902 may include a processor 918, a transceiver 920, a transmit/receive element 922, a speaker/microphone 924, a keypad 926, a display/touchpad 928, non-removable memory 930, removable memory 932, a power source 934, a global positioning system (GPS) chipset 936, and/or other peripherals 938, among others. It will be appreciated that the WTRU 902 may include any sub-combination of the foregoing elements while remaining consistent with an embodiment.

The processor 918 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 918 may perform signal coding, data processing, power control, input/output processing, and/or any other functionality that enables the WTRU 902 to operate in a wireless environment. The processor 918 may be coupled to the transceiver 920, which may be coupled to the transmit/receive element 922. While FIG. 9B depicts the processor 918 and the transceiver 920 as separate components, it will be appreciated that the processor 918 and the transceiver 920 may be integrated together in an electronic package or chip.

The transmit/receive element 922 may be configured to transmit signals to, or receive signals from, a base station (e.g., the base station 914a) over the air interface 916. For example, in one embodiment, the transmit/receive element 922 may be an antenna configured to transmit and/or receive RF signals. In an embodiment, the transmit/receive element 922 may be an emitter/detector configured to transmit and/or receive IR, UV, or visible light signals, for example. In yet another embodiment, the transmit/receive element 922 may be configured to transmit and/or receive both RF and light signals. It will be appreciated that the transmit/receive element 922 may be configured to transmit and/or receive any combination of wireless signals.

Although the transmit/receive element 922 is depicted in FIG. 9B as a single element, the WTRU 902 may include any number of transmit/receive elements 922. More specifically, the WTRU 902 may employ MIMO technology. Thus, in one embodiment, the WTRU 902 may include two or more transmit/receive elements 922 (e.g., multiple antennas) for transmitting and receiving wireless signals over the air interface 916.

The transceiver 920 may be configured to modulate the signals that are to be transmitted by the transmit/receive element 922 and to demodulate the signals that are received by the transmit/receive element 922. As noted above, the WTRU 902 may have multi-mode capabilities. Thus, the transceiver 920 may include multiple transceivers for enabling the WTRU 902 to communicate via multiple RATs, such as NR and IEEE 802.11, for example.

The processor 918 of the WTRU 902 may be coupled to, and may receive user input data from, the speaker/microphone 924, the keypad 926, and/or the display/touchpad 928 (e.g., a liquid crystal display (LCD) display unit or organic light-emitting diode (OLED) display unit). The processor 918 may also output user data to the speaker/microphone 924, the keypad 926, and/or the display/touchpad 928. In addition, the processor 918 may access information from, and store data in, any type of suitable memory, such as the non-removable memory 930 and/or the removable memory 932. The non-removable memory 930 may include random-access memory (RAM), read-only memory (ROM), a hard disk, or any other type of memory storage device. The removable memory 932 may include a subscriber identity module (SIM) card, a memory stick, a secure digital (SD) memory card, and the like. In other embodiments, the processor 918 may access information from, and store data in, memory that is not physically located on the WTRU 902, such as on a server or a home computer (not shown).

The processor 918 may receive power from the power source 934, and may be configured to distribute and/or control the power to the other components in the WTRU 902. The power source 934 may be any suitable device for powering the WTRU 902. For example, the power source 934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 918 may also be coupled to the GPS chipset 936, which may be configured to provide location information (e.g., longitude and latitude) regarding the current location of the WTRU 902. In addition to, or in lieu of, the information from the GPS chipset 936, the WTRU 902 may receive location information over the air interface 916 from a base station (e.g., base stations 914a, 914b) and/or determine its location based on the timing of the signals being received from two or more nearby base stations. It will be appreciated that the WTRU 902 may acquire location information by way of any suitable location-determination method while remaining consistent with an embodiment.

The processor 918 may further be coupled to other peripherals 938, which may include one or more software and/or hardware modules that provide additional features, functionality and/or wired or wireless connectivity. For example, the peripherals 938 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 938 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 902 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 918). In an embodiment, the WRTU 902 may include a half-duplex radio for which transmission and reception of some or all of the signals (e.g., associated with particular subframes for either the UL (e.g., for transmission) or the downlink (e.g., for reception)).

FIG. 9C is a system diagram illustrating the RAN 904 and the CN 906 according to an embodiment. As noted above, the RAN 904 may employ an E-UTRA radio technology to communicate with the WTRUs 902a, 902b, 902c over the air interface 916. The RAN 904 may also be in communication with the CN 906.

The RAN 904 may include eNode-Bs 960a, 960b, 960c, though it will be appreciated that the RAN 904 may include any number of eNode-Bs while remaining consistent with an embodiment. The eNode-Bs 960a, 960b, 960c may each include one or more transceivers for communicating with the WTRUs 902a, 902b, 902c over the air interface 916. In one embodiment, the eNode-Bs 960a, 960b, 960c may implement MIMO technology. Thus, the eNode-B 960a, for example, may use multiple antennas to transmit wireless signals to, and/or receive wireless signals from, the WTRU 902a.

Each of the eNode-Bs 960a, 960b, 960c may be associated with a particular cell (not shown) and may be configured to handle radio resource management decisions, handover decisions, scheduling of users in the UL and/or DL, and the like. As shown in FIG. 9C, the eNode-Bs 960a, 960b, 960c may communicate with one another over an X2 interface.

The CN 906 shown in FIG. 9C may include a mobility management entity (MME) 962, a serving gateway (SGW) 964, and a packet data network (PDN) gateway (or PGW) 966. While each of the foregoing elements are depicted as part of the CN 906, it will be appreciated that any of these elements may be owned and/or operated by an entity other than the CN operator.

The MME 962 may be connected to each of the eNode-Bs 962a, 962b, 962c in the RAN 904 via an S1 interface and may serve as a control node. For example, the MME 962 may be responsible for authenticating users of the WTRUs 902a, 902b, 902c, bearer activation/deactivation, selecting a particular serving gateway during an initial attach of the WTRUs 902a, 902b, 902c, and the like. The MME 962 may provide a control plane function for switching between the RAN 904 and other RANs (not shown) that employ other radio technologies, such as GSM and/or WCDMA.

The SGW 964 may be connected to each of the eNode Bs 960a, 960b, 960c in the RAN 904 via the S1 interface. The SGW 964 may generally route and forward user data packets to/from the WTRUs 902a, 902b, 902c. The SGW 964 may perform other functions, such as anchoring user planes during inter-eNode B handovers, triggering paging when DL data is available for the WTRUs 902a, 902b, 902c, managing and storing contexts of the WTRUs 902a, 902b, 902c, and the like.

The SGW 964 may be connected to the PGW 966, which may provide the WTRUs 902a, 902b, 902c with access to packet-switched networks, such as the Internet 910, to facilitate communications between the WTRUs 902a, 902b, 902c and IP-enabled devices.

The CN 906 may facilitate communications with other networks. For example, the CN 906 may provide the WTRUs 902a, 902b, 902c with access to circuit-switched networks, such as the PSTN 908, to facilitate communications between the WTRUs 902a, 902b, 902c and traditional land-line communications devices. For example, the CN 906 may include, or may communicate with, an IP gateway (e.g., an IP multimedia subsystem (IMS) server) that serves as an interface between the CN 906 and the PSTN 908. In addition, the CN 906 may provide the WTRUs 902a, 902b, 902c with access to the other networks 912, which may include other wired and/or wireless networks that are owned and/or operated by other service providers.

Although the WTRU is described in FIGS. 9A-9D as a wireless terminal, it is contemplated that in certain representative embodiments that such a terminal may use (e.g., temporarily or permanently) wired communication interfaces with the communication network.

In representative embodiments, the other network 912 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 9D is a system diagram illustrating the RAN 913 and the CN 915 according to an embodiment. As noted above, the RAN 913 may employ an NR radio technology to communicate with the WTRUs 902a, 902b, 902c over the air interface 916. The RAN 913 may also be in communication with the CN 915.

The RAN 913 may include gNBs 980a, 980b, 980c, though it will be appreciated that the RAN 913 may include any number of gNBs while remaining consistent with an embodiment. The gNBs 980a, 980b, 980c may each include one or more transceivers for communicating with the WTRUs 902a, 902b, 902c over the air interface 916. In one embodiment, the gNBs 980a, 980b, 980c may implement MIMO technology. For example, gNBs 980a, 908b may utilize beamforming to transmit signals to and/or receive signals from the gNBs 980a, 980b, 980c. Thus, the gNB 980a, for example, may use multiple antennas to transmit wireless signals to, and/or receive wireless signals from, the WTRU 902a. In an embodiment, the gNBs 980a, 980b, 980c may implement carrier aggregation technology. For example, the gNB 980a may transmit multiple component carriers to the WTRU 902a (not shown). A subset of these component carriers may be on unlicensed spectrum while the remaining component carriers may be on licensed spectrum. In an embodiment, the gNBs 980a, 980b, 980c may implement Coordinated Multi-Point (CoMP) technology. For example, WTRU 902a may receive coordinated transmissions from gNB 980a and gNB 980b (and/or gNB 980c).

The WTRUs 902a, 902b, 902c may communicate with gNBs 980a, 980b, 980c using transmissions associated with a scalable numerology. For example, the OFDM symbol spacing and/or OFDM subcarrier spacing may vary for different transmissions, different cells, and/or different portions of the wireless transmission spectrum. The WTRUs 902a, 902b, 902c may communicate with gNBs 98a, 980b, 980c using subframe or transmission time intervals (TTIs) of various or scalable lengths (e.g., containing varying number of OFDM symbols and/or lasting varying lengths of absolute time).

The gNBs 980a, 980b, 980c may be configured to communicate with the WTRUs 902a, 902b, 902c in a standalone configuration and/or a non-standalone configuration. In the standalone configuration, WTRUs 902a, 902b, 902c may communicate with gNBs 980a, 980b, 980c without also accessing other RANs (e.g., such as eNode-Bs 160a, 160b, 160c). In the standalone configuration, WTRUs 902a, 902b, 902c may utilize one or more of gNBs 980a, 980b, 980c as a mobility anchor point. In the standalone configuration, WTRUs 902a, 902b, 902c may communicate with gNBs 980a, 980b, 980c using signals in an unlicensed band. In a non-standalone configuration WTRUs 902a, 902b, 902c may communicate with/connect to gNBs 980a, 980b, 980c while also communicating with/connecting to another RAN such as eNode-Bs 960a, 960b, 960c. For example, WTRUs 902a, 902b, 902c may implement DC principles to communicate with one or more gNBs 980a, 980b, 980c and one or more eNode-Bs 960a, 960b, 960c substantially simultaneously. In the non-standalone configuration, eNode-Bs 960a, 960b, 960c may serve as a mobility anchor for WTRUs 902a, 902b, 902c and gNBs 980a, 980b, 980c may provide additional coverage and/or throughput for servicing WTRUs 902a, 902b, 902c.

Each of the gNBs 980a, 980b, 980c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 984a, 984b, routing of control plane information towards Access and Mobility Management Function (AMF) 982a, 982b and the like. As shown in FIG. 9D, the gNBs 980a, 980b, 980c may communicate with one another over an Xn interface.

The CN 915 shown in FIG. 9D may include at least one AMF 982a, 982b, at least one UPF 984a, 984b, at least one Session Management Function (SMF) 983a, 983b, and possibly a Data Network (DN) 985a, 985b. While each of the foregoing elements are depicted as part of the CN 915, it will be appreciated that any of these elements may be owned and/or operated by an entity other than the CN operator.

The AMF 982a, 982b may be connected to one or more of the gNBs 980a, 980b, 980c in the RAN 913 via an N2 interface and may serve as a control node. For example, the AMF 982a, 982b may be responsible for authenticating users of the WTRUs 902a, 902b, 902c, support for network slicing (e.g., handling of different PDU sessions with different requirements), selecting a particular SMF 983a, 983b, management of the registration area, termination of NAS signaling, mobility management, and the like. Network slicing may be used by the AMF 982a, 982b in order to customize CN support for WTRUs 902a, 902b, 902c based on the types of services being utilized WTRUs 902a, 902b, 902c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 962 may provide a control plane function for switching between the RAN 913 and other RANs (not shown) that employ other radio technologies, such as LTE, LTE-A, LTE-A Pro, and/or non-3GPP access technologies such as WiFi.

The SMF 983a, 983b may be connected to an AMF 982a, 982b in the CN 915 via an N11 interface. The SMF 983a, 983b may also be connected to a UPF 984a, 984b in the CN 915 via an N4 interface. The SMF 983a, 983b may select and control the UPF 984a, 984b and configure the routing of traffic through the UPF 984a, 984b. The SMF 983a, 983b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 984a, 984b may be connected to one or more of the gNBs 980a, 980b, 980c in the RAN 913 via an N3 interface, which may provide the WTRUs 902a, 902b, 902c with access to packet-switched networks, such as the Internet 910, to facilitate communications between the WTRUs 902a, 902b, 902c and IP-enabled devices. The UPF 984, 984b may perform other functions, such as routing and forwarding packets, enforcing user plane policies, supporting multi-homed PDU sessions, handling user plane QoS, buffering downlink packets, providing mobility anchoring, and the like.

The CN 915 may facilitate communications with other networks. For example, the CN 915 may include, or may communicate with, an IP gateway (e.g., an IP multimedia subsystem (IMS) server) that serves as an interface between the CN 915 and the PSTN 908. In addition, the CN 915 may provide the WTRUs 902a, 902b, 902c with access to the other networks 912, which may include other wired and/or wireless networks that are owned and/or operated by other service providers. In one embodiment, the WTRUs 902a, 902b, 902c may be connected to a local Data Network (DN) 985a, 985b through the UPF 984a, 984b via the N3 interface to the UPF 984a, 984b and an N6 interface between the UPF 984a, 984b and the DN 985a, 985b.

In view of FIGS. 9A-9D, and the corresponding description of FIGS. 9A-9D, one or more, or all, of the functions described herein with regard to one or more of: WTRU 902a-d, Base Station 914a-b, eNode-B 960a-c, MME 962, SGW 964, PGW 966, gNB 980a-c, AMF 982a-b, UPF 984a-b, SMF 983a-b, DN 985a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
receiving, at a mobile device at a first location, a broadcast wireless message, wherein the broadcast wireless message comprises (i) message content and (ii) first ambient signal data for a second location, wherein the first ambient signal data comprises at least a first ambient signal level for the second location,
wherein the message content corresponds to the second location, and
wherein the first location is different than the second location;
determining, at the mobile device at a third location, second ambient signal data;
comparing, at the mobile device, the first ambient signal data and the second ambient signal data; and
determining, at the mobile device, whether to present a message indicative of the message content to a user of the mobile device based at least in part on the comparison of the first ambient signal data and the second ambient signal data,
wherein the broadcast wireless message comprises a destination address of the mobile device of the user, the destination address comprising the first ambient signal level for the second location and a time interval during which the first ambient signal level for the second location is unique at the second location, and wherein the broadcast wireless message is broadcast using the destination address.

2. The method of claim 1,
wherein the first ambient signal data comprises a first plurality of ambient signal levels for a plurality of ambient signal types and the second ambient signal data comprises a second plurality of ambient signal levels for the plurality of ambient signal types, and
wherein comparing, at the mobile device, the first ambient signal data and the second ambient signal data comprises comparing, for each ambient signal type of the plurality of ambient signal types, respective ambient signal levels of the first and second pluralities of ambient signal levels.

3. The method of claim 2, wherein determining whether to present the message indicative of the message content to the user of the mobile device comprises:
presenting the message indicative of the message content based on an aggregate ambient signal comparison value exceeding a threshold, the aggregate ambient signal comparison value resulting from comparing, for each ambient signal type of the plurality of ambient signal types, respective ambient signal levels of the first and second pluralities of ambient signal levels.

4. The method of claim 1, wherein determining whether to present the message indicative of the message content to the user of the mobile device comprises:
presenting the message indicative of the message content only if a match is determined between the first ambient signal data and the second ambient signal data.

5. The method of claim 1, further comprising:
sending an acknowledgement message to an address associated with the broadcast wireless message,
wherein the acknowledgement message is indicative of at least one of:
receipt by the mobile device of the broadcast wireless message,
confirmation by the mobile device that the first ambient signal data was a match to the second ambient signal data, or
confirmation that the message indicative of the message content was presented to the user of the mobile device.

6. The method of claim 1,
wherein the first ambient signal data comprises a set of previously surveyed ambient signal data associated with the second location,
wherein the set of previously surveyed ambient signal data comprises data from at least one ambient signal from the group consisting of:
magnetic field direction, magnetic field intensity, magnetic field relative change, light intensity, WiFi, service set identifier (SSID), 3G, 4G, and 5G.

7. The method of claim 1, further comprising:
receiving a second broadcast wireless message comprising third ambient signal data;
determining that the second ambient signal data does not match the third ambient signal data; and
responsive to determining that the second ambient signal data does not match the third ambient signal data, filtering out the second broadcast wireless message.

8. The method of claim 1, wherein determining whether to present the message indicative of the message content to the user of the mobile device comprises:
determining an acceptable match between the first ambient signal data and the second ambient signal data based on the comparison of the first ambient signal data and the second ambient signal data; and responsive to determining the acceptable match, causing the message indicative of the message content to be presented to the user of the mobile device, wherein the message indicative of the message content comprises the message content.

9. The method of claim 1, wherein determining the second ambient signal data comprises sensing the second ambient signal data using a sensor device and recording a time value for the second ambient signal data, and wherein comparing the first ambient signal data and the second ambient signal data comprises comparing the time value for the second ambient signal data with the time interval in the broadcast wireless message.

10. The method of claim 1, further comprising:

transmitting, from the mobile device, wireless message receipt data corresponding to the broadcast wireless message, wherein the wireless message receipt data is indicative of at least one of:
  the message content of the broadcast wireless message,
  the message indicative of the message content,
  the first ambient signal data,
  the second ambient signal data,
  the comparison of the first ambient signal data and the second ambient signal data, or
  the determination of whether to present the message indicative of the message content.

11. The method of claim 1, wherein determining whether to present the message indicative of the message content to the user of the mobile device comprises:

determining whether to present the message indicative of the message content at a user interface of the mobile device.

12. A mobile device comprising:

a user interface;

a processor; and a non-transitory computer-readable medium storing instructions operative when executed by the processor to cause the mobile device to:

receive, at the mobile device at a first location, a broadcast wireless message,
  wherein the broadcast wireless message comprises (i) message content and (ii) first ambient signal data for a second location, wherein the first ambient signal data comprises at least a first ambient signal level for the second location,
  wherein the message content corresponds to the second location, and
  wherein the first location is different than the second location;

determine, at the mobile device at a third location, second ambient signal data;

compare, at the mobile device, the first ambient signal data and the second ambient signal data; and determine, at the mobile device, whether to present a message indicative of the message content to a user of the mobile device based at least in part on the comparison of the first ambient signal data and the second ambient signal data, wherein the broadcast wireless message comprises a destination address of the mobile device of the user, the destination address comprising the first ambient signal level for the second location and a time interval during which the first ambient signal level for the second location is unique at the second location, and wherein the broadcast wireless message is broadcast using the destination address.

13. A method comprising:

identifying a shape indicative of a user at a first location using video camera data;

determining a first ambient signal level for a second location based at least in part on previously surveyed ambient signal data corresponding to the second location; and sending a broadcast wireless message to at least a mobile device at the first location in range of the second location,
  wherein the broadcast wireless message comprises (i) message content and (ii) the first ambient signal level for the second location,
  wherein the message content corresponds to the second location,
  wherein the first location is different than the second location,
  wherein sending the broadcast wireless message comprises broadcasting the broadcast wireless message using a destination address of a mobile device of the user, the destination address comprising the first ambient signal level for the second location and a time interval during which the first ambient signal level for the second location is unique at the second location, and
  wherein the broadcast wireless message comprises the destination address.

14. The method of claim 13, wherein identifying the shape indicative of the user at the first location using the video camera data comprises:

receiving camera data from a video camera;

analyzing the camera data to detect a blob representative of the user; and localizing the blob at the first location.

15. The method of claim 13, further comprising:

determining the message content of the broadcast wireless message based at least in part on the second location.

16. The method of claim 13, wherein determining the first ambient signal level for the second location comprises:

determining a location of a second user at a third location;

obtaining previously surveyed ambient signal data for the third location; and determining the first ambient signal level for the second location based on a difference between the previously surveyed ambient signal data for the second location and the previously surveyed ambient signal data for the third location.

* * * * *